(12) United States Patent
Benko et al.

(10) Patent No.: US 9,480,907 B2
(45) Date of Patent: Nov. 1, 2016

(54) IMMERSIVE DISPLAY WITH PERIPHERAL ILLUSIONS

(71) Applicant: MICROSOFT TECHNOLOGY LICENSING, LLC, Redmond, WA (US)

(72) Inventors: Hrvoje Benko, Seattle, WA (US); Brett R. Jones, Champaign, IL (US); Eyal Ofek, Redmond, WA (US); Andrew Wilson, Seattle, WA (US); Gritsko Perez, Gilroy, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 170 days.

(21) Appl. No.: 13/891,116

(22) Filed: May 9, 2013

(65) Prior Publication Data

US 2014/0051510 A1    Feb. 20, 2014

Related U.S. Application Data

(63) Continuation-in-part of application No. 13/039,179, filed on Mar. 2, 2011, now abandoned.

(60) Provisional application No. 61/749,779, filed on Jan. 7, 2013.

(51) Int. Cl.
*A63F 13/10*    (2006.01)
*A63F 13/00*    (2014.01)
(Continued)

(52) U.S. Cl.
CPC ............. *A63F 13/00* (2013.01); *A63F 13/10* (2013.01); *A63F 13/45* (2014.09); *G06F 3/011* (2013.01); *G06F 3/1423* (2013.01); *H04N 7/002* (2013.01); *A63F 13/213* (2014.09); *A63F 13/26* (2014.09);
(Continued)

(58) Field of Classification Search
CPC ........... A63F 13/10; A63F 2300/1093; A63F 2300/301; A63F 2300/308
USPC ........................................................ 463/31
See application file for complete search history.

(56) References Cited

U.S. PATENT DOCUMENTS 4,402,608 A    9/1983  DiMatteo et al.
4,786,966 A   11/1988  Hanson et al.
(Continued)

FOREIGN PATENT DOCUMENTS

CN    1378741 A    11/2002
JP    04056993 A    2/1992
(Continued)

OTHER PUBLICATIONS

Baribeau, et al., "Color Reflectance Modeling Using a Polychromatic Laser Range Sensor", Retrieved at<<http://www.cs.virginia.edu/~mjh7v/bib/Baribeau92.pdf>>, IEEE Transactions on Pattern Analysis and Machine Intelligence vol. 14 No. 2, Feb. 1992, 7 pages.

(Continued)

*Primary Examiner* — David L Lewis
*Assistant Examiner* — Shauna-Kay Hall
(74) *Attorney, Agent, or Firm* — Dan Choi; Micky Minhas

(57) ABSTRACT

A primary display displays a primary image. A peripheral illusion is displayed around the primary display by an environmental display so that the peripheral illusion appears as an extension of the primary image.

19 Claims, 8 Drawing Sheets

(51) Int. Cl.

| | | |
|---|---|---|
| *A63F 13/45* | (2014.01) | |
| *A63F 13/40* | (2014.01) | |
| *G06F 3/01* | (2006.01) | |
| *H04N 7/00* | (2011.01) | |
| *G06F 3/14* | (2006.01) | |
| *A63F 13/213* | (2014.01) | |
| *A63F 13/26* | (2014.01) | |
| *G09G 5/12* | (2006.01) | |
| *G09G 3/00* | (2006.01) | |

(52) U.S. Cl.
CPC .. *A63F 2300/1093* (2013.01); *A63F 2300/301* (2013.01); *A63F 2300/308* (2013.01); *A63F 2300/6045* (2013.01); *G09G 3/001* (2013.01); *G09G 5/12* (2013.01)

(56) References Cited

U.S. PATENT DOCUMENTS

| | | | |
|---|---|---|---|
| 5,511,148 | A | 4/1996 | Wellner |
| 5,552,839 | A | 9/1996 | Kuhl |
| 5,714,997 | A | 2/1998 | Anderson |
| 5,870,136 | A | 2/1999 | Fuchs et al. |
| 6,009,359 | A | 12/1999 | El-Hakim et al. |
| 6,252,579 | B1 | 6/2001 | Rosenberg et al. |
| 6,369,805 | B1 | 4/2002 | Kuzunuki et al. |
| 6,431,711 | B1 | 8/2002 | Pinhanez |
| 6,542,154 | B1 | 4/2003 | Knittel |
| 6,570,566 | B1 | 5/2003 | Yoshigahara |
| 7,027,040 | B2 | 4/2006 | Rekimoto et al. |
| 7,027,659 | B1 | 4/2006 | Thomas et al. |
| 7,069,516 | B2 | 6/2006 | Rekimoto |
| 7,164,789 | B2 | 1/2007 | Chen et al. |
| 7,182,465 | B2 | 2/2007 | Fuchs et al. |
| 7,199,793 | B2 | 4/2007 | Oh et al. |
| 7,204,428 | B2 | 4/2007 | Wilson |
| 7,242,818 | B2 | 7/2007 | Beardsley et al. |
| 7,260,474 | B1 | 8/2007 | Thayathil et al. |
| 7,348,963 | B2 | 3/2008 | Bell |
| 7,379,047 | B2 | 5/2008 | Drucker et al. |
| 7,394,459 | B2 | 7/2008 | Bathiche et al. |
| 7,479,967 | B2 | 1/2009 | Bachelder et al. |
| 7,576,727 | B2 | 8/2009 | Bell |
| 7,599,561 | B2 | 10/2009 | Wilson et al. |
| 7,747,067 | B2 | 6/2010 | Popescu et al. |
| 7,812,815 | B2 | 10/2010 | Banerjee et al. |
| 7,843,449 | B2 | 11/2010 | Krah |
| 7,942,530 | B2 | 5/2011 | Majumder et al. |
| 8,035,614 | B2 | 10/2011 | Bell et al. |
| 8,068,095 | B2 | 11/2011 | Pryor |
| 8,130,330 | B2 | 3/2012 | Tan et al. |
| 8,427,424 | B2 | 4/2013 | Wilson et al. |
| 8,570,320 | B2 | 10/2013 | Izadi et al. |
| 8,570,423 | B2 | 10/2013 | Robinson et al. |
| 9,137,511 | B1 | 9/2015 | LeGrand et al. |
| 2001/0035845 | A1 | 11/2001 | Zwern |
| 2001/0044858 | A1 | 11/2001 | Rekimoto |
| 2001/0048429 | A1 | 12/2001 | Liao et al. |
| 2002/0105623 | A1 | 8/2002 | Pinhanez |
| 2002/0158873 | A1 | 10/2002 | Williamson |
| 2003/0020707 | A1 | 1/2003 | Kangas et al. |
| 2003/0034976 | A1 | 2/2003 | Raskar et al. |
| 2003/0042401 | A1 | 3/2003 | Gartner et al. |
| 2003/0071784 | A1 | 4/2003 | Sato et al. |
| 2003/0227470 | A1 | 12/2003 | Genc et al. |
| 2004/0037450 | A1 | 2/2004 | Bradski |
| 2004/0046711 | A1 | 3/2004 | Triebfuerst |
| 2004/0046736 | A1* | 3/2004 | Pryor et al. ................. 345/156 |
| 2004/0183775 | A1 | 9/2004 | Bell |
| 2004/0257540 | A1 | 12/2004 | Roy et al. |
| 2005/0099603 | A1 | 5/2005 | Thomas et al. |
| 2005/0135670 | A1 | 6/2005 | Vaidyanathan |
| 2005/0185150 | A1 | 8/2005 | Turner et al. |
| 2006/0001645 | A1 | 1/2006 | Drucker et al. |
| 2006/0001650 | A1 | 1/2006 | Robbins et al. |
| 2006/0036944 | A1 | 2/2006 | Wilson |
| 2006/0109239 | A1 | 5/2006 | Hsiung |
| 2006/0139314 | A1 | 6/2006 | Bell |
| 2006/0158452 | A1 | 7/2006 | Borger et al. |
| 2006/0294247 | A1 | 12/2006 | Hinckley et al. |
| 2007/0013716 | A1 | 1/2007 | Kjeldsen et al. |
| 2007/0055782 | A1 | 3/2007 | Wright et al. |
| 2007/0124370 | A1 | 5/2007 | Nareddy et al. |
| 2007/0126864 | A1* | 6/2007 | Bhat ..................... H04N 5/144 |
| | | | 348/51 |
| 2007/0126938 | A1* | 6/2007 | Tan et al. .................... 348/739 |
| 2007/0132733 | A1 | 6/2007 | Ram |
| 2007/0247422 | A1 | 10/2007 | Vertegaal et al. |
| 2007/0299338 | A1 | 12/2007 | Stevick et al. |
| 2008/0002262 | A1 | 1/2008 | Chirieleison |
| 2008/0007567 | A1 | 1/2008 | Clatworthy et al. |
| 2008/0031327 | A1 | 2/2008 | Wang et al. |
| 2008/0095468 | A1 | 4/2008 | Klemmer et al. |
| 2008/0180402 | A1 | 7/2008 | Yoo et al. |
| 2008/0199071 | A1 | 8/2008 | Gu |
| 2008/0214233 | A1 | 9/2008 | Wilson et al. |
| 2008/0229194 | A1 | 9/2008 | Boler et al. |
| 2008/0231634 | A1 | 9/2008 | Gyde et al. |
| 2008/0246781 | A1 | 10/2008 | Surati et al. |
| 2008/0263458 | A1 | 10/2008 | Altberg et al. |
| 2008/0285843 | A1 | 11/2008 | Lim |
| 2008/0316201 | A1 | 12/2008 | Nayar et al. |
| 2009/0027330 | A1 | 1/2009 | Aida |
| 2009/0037841 | A1 | 2/2009 | Bell et al. |
| 2009/0091581 | A1 | 4/2009 | Lapa |
| 2009/0109280 | A1 | 4/2009 | Gotsman et al. |
| 2009/0124379 | A1 | 5/2009 | Wells |
| 2009/0128783 | A1 | 5/2009 | Shih et al. |
| 2009/0143141 | A1 | 6/2009 | Wells et al. |
| 2009/0149250 | A1 | 6/2009 | Middleton |
| 2009/0167966 | A1 | 7/2009 | Nam et al. |
| 2009/0215533 | A1 | 8/2009 | Zalewski et al. |
| 2009/0217187 | A1 | 8/2009 | Kendall et al. |
| 2009/0237564 | A1 | 9/2009 | Kikinis et al. |
| 2009/0244309 | A1 | 10/2009 | Maison et al. |
| 2010/0037273 | A1 | 2/2010 | Dressel et al. |
| 2010/0073366 | A1 | 3/2010 | Tateno |
| 2010/0073476 | A1 | 3/2010 | Liang et al. |
| 2010/0103196 | A1 | 4/2010 | Kumar et al. |
| 2010/0103386 | A1 | 4/2010 | Kubota |
| 2010/0128112 | A1* | 5/2010 | Marti ..................... G06F 3/011 |
| | | | 348/51 |
| 2010/0164990 | A1 | 7/2010 | Van Doorn |
| 2010/0182416 | A1 | 7/2010 | Holmgren et al. |
| 2010/0194863 | A1 | 8/2010 | Lopes et al. |
| 2010/0194872 | A1 | 8/2010 | Mathe et al. |
| 2010/0199230 | A1 | 8/2010 | Latta et al. |
| 2010/0201878 | A1 | 8/2010 | Barenbrug et al. |
| 2010/0201894 | A1 | 8/2010 | Nakayama et al. |
| 2010/0225743 | A1 | 9/2010 | Florencio et al. |
| 2010/0281432 | A1 | 11/2010 | Geisner et al. |
| 2010/0302015 | A1* | 12/2010 | Kipman ................ A63F 13/06 |
| | | | 340/407.1 |
| 2010/0315491 | A1 | 12/2010 | Carter et al. |
| 2010/0330843 | A1 | 12/2010 | Gao et al. |
| 2011/0018903 | A1 | 1/2011 | Lapstun et al. |
| 2011/0025689 | A1 | 2/2011 | Perez et al. |
| 2011/0058709 | A1 | 3/2011 | Kipman et al. |
| 2011/0107216 | A1 | 5/2011 | Bi |
| 2011/0205242 | A1 | 8/2011 | Friesen |
| 2011/0205341 | A1 | 8/2011 | Wilson et al. |
| 2011/0216948 | A1 | 9/2011 | Yalla et al. |
| 2011/0234481 | A1 | 9/2011 | Katz et al. |
| 2011/0263326 | A1 | 10/2011 | Gagner et al. |
| 2011/0304691 | A1 | 12/2011 | Newton et al. |
| 2011/0316845 | A1 | 12/2011 | Roberts et al. |
| 2012/0086624 | A1 | 4/2012 | Thompson et al. |
| 2012/0105585 | A1 | 5/2012 | Masalkar et al. |
| 2012/0113223 | A1 | 5/2012 | Hilliges et al. |
| 2012/0117514 | A1 | 5/2012 | Kim et al. |
| 2012/0140038 | A1 | 6/2012 | Bi et al. |
| 2012/0154277 | A1 | 6/2012 | Bar-Zeev et al. |
| 2012/0154619 | A1 | 6/2012 | Lee |
| 2012/0157204 | A1 | 6/2012 | Kelsey et al. |

(56) References Cited

U.S. PATENT DOCUMENTS

| | | |
|---|---|---|
| 2012/0162254 A1 | 6/2012 | Anderson et al. |
| 2012/0194516 A1 | 8/2012 | Newcombe et al. |
| 2012/0194517 A1 | 8/2012 | Izadi et al. |
| 2012/0212509 A1 | 8/2012 | Benko et al. |
| 2012/0223885 A1 | 9/2012 | Perez |
| 2012/0223909 A1 | 9/2012 | Tse et al. |
| 2012/0264510 A1 | 10/2012 | Wigdor et al. |
| 2012/0268570 A1 | 10/2012 | Trumbull et al. |
| 2012/0274745 A1 | 11/2012 | Russell |
| 2012/0293548 A1 | 11/2012 | Perez et al. |
| 2012/0315965 A1 | 12/2012 | Bathiche |
| 2013/0002815 A1 | 1/2013 | Smoot et al. |
| 2013/0069985 A1 | 3/2013 | Wong et al. |
| 2013/0147686 A1 | 6/2013 | Clavin et al. |
| 2013/0187835 A1 | 7/2013 | Vaught et al. |
| 2013/0229353 A1 | 9/2013 | Hartmann et al. |
| 2013/0336629 A1 | 12/2013 | Mulholland et al. |
| 2014/0125785 A1 | 5/2014 | Na et al. |
| 2015/0049001 A1 | 2/2015 | Liu et al. |

FOREIGN PATENT DOCUMENTS

| | | |
|---|---|---|
| JP | 04328627 A | 11/1992 |
| JP | 07129319 A | 5/1995 |
| JP | 07168949 A | 7/1995 |
| JP | 09046776 A | 2/1997 |
| JP | 11134327 A | 5/1999 |
| JP | 2000322367 A | 11/2000 |
| JP | 2001175374 A | 6/2001 |
| JP | 2005031747 A | 2/2005 |
| JP | 2006148730 A | 6/2006 |
| JP | 2007226406 A | 9/2007 |
| JP | 2007299384 A | 11/2007 |
| JP | 2008033844 A | 2/2008 |
| JP | 2008112077 A | 5/2008 |
| JP | 2012510673 A | 5/2012 |
| KR | 1020020040773 A | 5/2002 |
| KR | 100811015 B1 | 2/2008 |
| TW | I335009 B | 12/2010 |
| WO | 2005017739 A1 | 2/2005 |
| WO | 2007134456 A1 | 11/2007 |
| WO | 2009069958 A2 | 6/2009 |
| WO | 2010019802 A1 | 2/2010 |
| WO | 2011106201 A2 | 9/2011 |

OTHER PUBLICATIONS

Manabe, et al., "Three Dimensional Measurement using Color Structured Patterns and Imaging Spectrograph", Retrieved at<<http://ieeexplore.ieee.org/stamp/stamp.jsp?arnumber=01048022>>, Proceedings 16th International Conference on Pattern Recognition, vol. 3., Dec. 10, 2002, 4 pages.
Song, et al., "Use of LCD Panel for Calibrating Structured-Light-Based Range Sensing System", Retrieved at<<http://ieeexplore.ieee.org/stamp/stamp.jsp?arnumber=04538270>>, IEEE Transactions on Instrumentation and Measurement, vol. 57, No. 11, Oct. 10, 2008, 8 Pages.
Bishop, Todd, "Q&A: Microsoft LightSpace, One Step Closer to Star Trek Holodeck",Retrieved at<<http://www.techflash.com/seattle/2010/10/qa_microsoft_lightspace_one_step_closer_to_star_trek_holodeck.html>>, Oct. 7, 2010, 4 Pages.
"I-Cocoon: The Next Wii?",Retrieved at<<http://www.dailygame.net/news/archives/008261.php>>, Nov. 9, 2008, 4 Pages.
"Structured Light 3D Scanning", Retrieved at<<http://sites.google.com/site/structuredlight/techniques>>, Nov. 26, 2010, 3 Pages.
"International Search Report and Written Opinion", Mailed Date: Sep. 28, 2012, Application No. PCT/US2012/026823, Filed Date: Feb. 27, 2012, 6 Pages.
"Liquid Crystal Shutter Glasses", Retrieved at <<http://en.wikipedia.org/wiki/Active_shutter_glasses >>, Retrieved Date: Apr. 8, 2011, 6 pages.
"Stereoscopy", Retrieved at << http://enwikipedia.org/wiki/Stereoscopy >>, Retrieved Date: Apr. 8, 2011, 21 pages.
European Patent Office, Office Action Issued in European Patent Application No. 12752325.6, Aug. 6, 2014, Germany, 8 Pages.
Ates, et al., "Immersive Simulation of Visual Impairments Using a Wearable See-through Display", in Proceedings of the Ninth International Conference on Tangible, Embedded, and Embodied Interaction., Published on Feb. 2014, 4 Pages.
Bell, et al., "Dynamic Space Management for User Interfaces", In ACM Symposium on User Interface Software and Technology, Nov. 2000, pp. 239-248.
Benko, et al., "Dyadic Projected Spatial Augmented Reality", In Proceedings of the 27th annual ACM symposium on User interface software and technology. ACM, 2014, Published on Oct. 5, 2014, 11 Pages.
Benko, et al., "Mirage Table: Freehand Interaction on a Projected Augmented Reality Tabletop", In Proceedings of the SIGCHI Conference on Human Factors in Computing Systems, Published on May 5, 2012, 10 Pages.
Benko, et al., "Multi-Point Interactions with Immersive Omnidirectional Visualizations in a Dome", In ACM International Conference on Interactive Tabletops and Surfaces, Published on Nov. 7, 2010, 10 Pages.
Billinghurst, et al., "Shared Space—An Augmented Reality Approach for Computer Supported Collaborative Work", Virtual Reality vol. 3, No. 1, Published on Mar. 1998, 12 Pages.
Billinghurst, et al., "Tangible Augmented Reality", In ACM Special Interest Group on Computer Graphics and Interactive Techniques, Published on 2008, pp. 1-10.
Bimber, et al., "Spatial Augmented Reality: Merging Real and Virtual Worlds", AK Peters, Ltd. / CRC Press, Published by Aug. 8, 2005, 393 Pages.
Bolt, et al., "Put-That-There: Voice and Gesture at the Graphics Interface", SIGGRAPH '80 Proceedings of the 7th annual conference on Computer graphics and interactive techniques, Published on Jul. 14, 1980, 9 Pages.
Borkowski, et al., "Spatial Control of Interactive Surfaces in an Augmented Environment", In EHCI-DSVIS'04 Proceedings of the 2004 international conference on Engineering Human Computer Interaction and Interactive Systems, Published on Jul. 11, 2004, 16 Pages.
Boverie, et al., "Comparison of Structured Light and Stereovision Sensors for New Airbag Generations", In Journal of Control Engineering Practice, vol. 11 No. 12, Dec. 2003, pp. 1413-1421.
Brignull, et al., "The Introduction of a Shared Interactive Surface into a Communal Space", In Proceedings of the ACM Conference on Computer Supported Cooperative Work, Nov. 2004, 10 Pages.
Buchenau, et al., "Experience Prototyping", In Proceedings of the 3rd Conference on Designing Interactive Systems: Processes, Practices, Methods, and Techniques, Aug. 2000, pp. 424-433.
Butz, et al., "Applying the Peephole Metaphor in a Mixed-Reality Room", Computer Graphics and Applications, vol. 26, No. 1, Published on Jan. 2006, 8 Pages.
Butz, et al., "Searchlight—A Lightweight Search Function for Pervasive Environments", In Proceedings of the Second International Conference on Pervasive Computing, Published on Apr. 2004, 6 Pages.
"Multi-User Interaction Using Handheld Projectors", In Proceedings of the 2oth Annual ACM Symposium on User Interface Software and Technology, Published on Oct. 7, 2007, 10 Pages.
"Adaptive Instant Displays: Continuously Calibrated Projections Using Per-Pixel Light Control", In Computer Graphics Forum. vol. 24. No. 3. Blackwell Publishing, Inc, Sep. 2005, pp. 705-714.
"Steerable Projection: Exploring Alignment in Interactive Mobile Displays", In Personal and Ubiquitous Computing, vol. 16, No. 1, Published on Jan. 1, 2012, 11 Pages.
"Designers' Use of Paper and the Implications for Informal Tools", In Proceedings of the 1st Australia Conference on Computer-Human Interaction: Citizens Online: Considerations for Today and the Future, Nov. 2005, 10 Pages.
"Interactive Environment-Aware Display Bubbles", In Proceedings of the 19th Annual ACM Symposium on User Interface Software and Technology, Oct. 2006, pp. 245-254.

(56) References Cited

OTHER PUBLICATIONS

"Coupling Interaction Resources: An Analytical Model", In Proceedings of the Joint Conference on Smart Objects and Ambient Intelligence: Innovative Context-Aware services: UsaQes and TechnoloQies, Oct. 2005, pp. 183-188.
Dias, et al., "Tangible Interaction for Conceptual Architectural Design", In First IEEE International Workshop on Augmented Reality Toolkit, Sep. 2002, 9 Pages.
Dietz, et al., "DiamondTouch: A multi-user Touch Technology", In 14th Annual ACM Symposium on User Interface Software and Technology, Nov. 2001, 10 Pages.
Dodds, et al., "A Communication Task in HMO Virtual Environments: Speaker and Listener Movement", In Proceedings of the 23rd Annual Conference on Computer Animation and Social Agents (CASA), 2010, 4 Pages.
Ehnes, et al., "Projected Augmentation—Augmented Reality Using Rotatable Video Projectors", In Proceeding of Third IEEE and ACM International Symposium on Mixed and Augmented Reality, Published on Nov. 2, 2004, 10 Pages.
El-Hakim, et al., "Sensor Based Creation of Indoor Virtual Environment Models", In Proceedings of the 1997 International Conference on Virtual Systems and MultiMedia, Sep. 10, 1997, 9 Pages.
El-Hakim, et al., "Two 3-D Sensors for Environment Modeling and Virtual Reality: Calibration and Multi-View Registration", Proceedings of International Archives on Photogrammetry and Remote Sensing, vol. 31, Part B5, Commission V, Jul. 12, 1996, 10 Pages.
"Projective Texture Mapping", Retrieved from <<https://web.archive.org/web/20031005055851/http://developer.nvidia.com/object/Projective_Texture_Mapping.html>>, Published on Apr. 24, 2001, 7 Pages.
Fitzmaurice, et al., "Bricks: Laying the Foundations for Graspable User Interfaces", In Proceedings of the SIGCHI Conference on Human Factors in Computing Systems, CHI '95, May 1, 1995, pp. 442-449.
Forelines, et al., "Direct-touch vs. Mouse Input for Tabletop Displays", In Proceedings of the SIGCHI Conference on Human Factors in Computing Systems, Apr. 2007, pp. 647-656.
Fuchs, et al., "Augmented Reality Visualization for Laparoscopic Surgery", In Proceedings of the First International Conference on Medical Image Computing and Computer-Assisted Intervention, Oct. 11, 1998, 10 Pages.
Gargallo, et al., "Bayesian 3D Modeling from Images using Multiple Depth Maps", In IEEE Computer Society Conference on Computer Vision and Pattern Recognition, Jun. 2005, pp. 885-891.
Gingichashvili, Sarah, "PlayAnywhere—Microsoft's Interactive Playground", Retrieved from <<http://web.archive.org/web/20100507045636/http://thefutureofthings.com/news/1037/playanywhere-microsofts-interactive-playground.html>>, Nov. 2, 2007, 2 Pages.
Grossman, et al., "An Interface for Creating and Manipulating Curves Using a High Degree-of-freedom Curve Input Device", In Proceedings of the SIGCHI Conference on Human Factors in Computing Systems, Apr. 5, 2003, pp. 185-192.
Guimbretiere, et al., "Fluid Interaction with High-Resolution Wall-Size Displays", In Proceedings of the 14th Annual ACM Symposium on User Interface Software and Technology, Nov. 2001, pp. 21-30.
Hailpern, et al., "Team Storm: Demonstrating an Interaction Model for Working with Multiple Ideas During creative Group Work", In Proceedings of the 6th ACM SIGCHI Conference on Creativity & Cognition, Jun. 2007, pp. 193-202.
Haller, et al., "Shared Design Space: Sketching Ideas Using Digital Pens and a Large Augmented Tabletop Setup", In 16th International Conference on Artificial Reality and Telexistence, Nov. 2006, 12 Pages.
"OmniTouch: Wearable Multitouch Interaction Everywhere", In Proceedings of the 24th Annual ACM Symposium on User Interface Software and Technology, Published on Oct. 16, 2011, 10 Pages.

Henrysson, et al., "Face to face collaborative AR on mobile phones", In Proceedings of Fourth IEEE and ACM International Symposium Mixed and Augmented Reality, 2005, Published on Oct. 5, 2005, pp. 80-89.
Hilliges, et al., "Interactions in the Air: Adding Further Depth to Interactive Tabletops,", In Proceedings of the 22nd annual ACM symposium on User interface software and technology, UIST '09, Published on Oct. 4, 2009, pp. 139-148.
Hinrichs, et al., "Examination of Text-Entry Methods for Tabletop Displays", In Second Annual IEEE International Workshop on Horizontal Interactive Human-Computer Systems, Oct. 2007, pp. 105-112.
Holman, et al., "Paper Windows: Interaction Techniques for Digital Paper", In Proceedings of the SIGCHI Conference on Human Factors in Computing Systems, Apr. 2005, pp. 591-599.
Hosokawa, et al., "Tangible Design Support System Using RFID Technology", In Proceedings of the 2nd International Conference on Tangible and Embedded Interaction, Feb. 18, 2008, pp. 75-78.
Hu, et al., "Sensors and Data Fusion Algorithms in Mobile Robotics", Technical Report CSM-422 University of Essex, Jan. 10, 2005, 13 Pages.
Jota, et al., "Constructing Virtual 3D Models With Physical Building Blocks", In Extended Abstracts on Human Factors in Computing Systems, May 2011, 6 Pages.
Kim, et al., "Video-Based Document Tracking: Unifying Your Physical and Electronic Desktops", In Proceedings of the Annual ACM Symposium on User Interface Software and Technology, Oct. 2004, pp. 99-107.
Kitamura, et al., "Real-time 3D Interaction with ActiveCube", In Conference on Human Factors in Computing Systems, Mar. 31, 2001, pp. 355-356.
Kjeldsen, et al., "Interacting with Steerable Projected Displays", In Proceedings of the Fifth IEEE International Conference on Automatic Face and Gesture Recognition, Published on May 21, 2002, 6 Pages.
Klemmer, et al., "How Bodies Matter: Five Themes for Interaction Design", In Proceedings of the Designing Interactive Systems, Jun. 2006, pp. 140-149.
Klemmer, Scott R., "Integrating Physical and Digital Interactions", In IEEE Computer Society, Oct. 2005, 4 Pages.
"A Framework for Understanding the Workspace Activity of Design Teams", In Proceedings of the ACM Conference on Computer-Supported Cooperative Work, Jan. 1988, pp. 244-249.
"Augmented Reality Systems for Medical Applications", Retrieved at: <<http://ieeexplore.ieee.org/stamp/stamp.jsp?tp=&arnumber=677169&isnumber=14884>>, In Proceedings of Engineering in Medicine and Biology Magazine, IEEE, vol. 17, Issue: 3, Published on May 1998, pp. 49-58.
"A New Technique for Fully Autonomous and Efficient 3D Robotics Hand/Eye Calibration", In Proceedings of IEEE Transactions on Robotics and Automation, vol. 5, No. 3, Published on Jun. 1989, 14 Pages.
Ullmer, et al., "The metaDESK: Models and Prototypes for Tangible User Interfaces", In Proceedings of the 10th Annual ACM Symposium on User Interface Software and Technology, Oct. 1997, pp. 223-232.
Underkoffler, et al., "Emancipated Pixels: Real-World Graphics in the Luminous Room", In Proceedings of the 26th Annual Conference on Computer Graphics and Interactive Techniques, ACM Press/Addison-Wesley Publishing Co., Published on Jul. 1, 1999, 8 Pages.
Underkoffler, et al., "Urp: A Lumious-Tangible Workbench for Urban Planning and Design", In Proceedings of the SIGCHI Conference on Human Factors in Computing Systems, May 1999, pp. 386-393.
"Interacting with Paper on the Digital Desk", In Communications of the ACM—Special Issue on Computer Augmented Environments: Back to the Real World, vol. 36, Issue 7, Jul. 1993, pp. 87-96.
Willis, et al., "SideBySide: Ad-hoc Multi-user Interaction with Handheld Projectors", In Proceedings of the 24th Annual ACM Symposium on User Interface Software and Technology, ACM, Published on Oct. 16, 2011, 10 Pages.

(56) References Cited

OTHER PUBLICATIONS

Wilson, et al., "Bringing Physics to the Surface", In Proceedings of the 21 s Annual ACM Symposium on User Interface Software and Technology, Oct. 2008, pp. 67-76.
Wilson, et al., "Combining Multiple Depth Cameras and Projectors for Interactions on, above and between Surfaces", In Proceedings of the 23rd Annual ACM Symposium on User Interface Software and Technology, UIST '10, Published on Oct. 3, 2010, pp. 273-282.
Wilson, Andrew D., "Depth-Sensing Video Cameras for 3D Tangible Tabletop Interaction", In Second Annual IEEE International Workshop on Horizontal Interactive Human-Computer Systems, Oct. 2007, pp. 201-204.
Wilson, et al., "FiowMouse: A Computer Vision-Based Pointing and Gesture Input Device", In Human-Computer Interaction—INTERACT, Sep. 2005, 14 Pages.
Wilson, D. Andrew., "Simulating Grasping Behavior on an Imaging Interactive Surface", In Proceedings of the ACM International Conference on Interactive Tabletops and Surfaces, ITS '09, Published on Oct. 23, 2009, pp. 125-132.
Wilson, et al., "Steerable Augmented Reality with the Beamatron", In Proceedings of the 25th annual ACM symposium on User Interface Software and Technology (USIT), ACM, 2012., Published on Oct. 7, 2012, 10 Pages.
Wind, et al., "Applications of the Responsive Workbench", In Proceedings of IEEE Computer Graphics and Applications, vol. 17, Issue: 4, Published on Jul. 1997, pp. 10-15.
Wu, et al., "Gesture Registration, Relaxation, and Reuse for Multi-Point Direct-Touch Surfaces", In Proceedings of the First IEEE International Workshop on Horizontal Interactive Human-Computer Systems (TABLETOP '06), Jan. 2006, 8 Pages.
Zhang, et al., "A Flexible New Technique for Camera Calibration", In IEEE Transactions on Pattern Analysis and Machine Intelligence, vol. 22, No. 11, Published on Nov. 1, 2000, 5 Pages.
Zhang, et al., "Visual Panel: Virtual Mouse, Keyboard and 3D Controller with an Ordinary Piece of Paper", In Proceedings of the Workshop on Perceptive User Interfaces, Nov. 2001, 8 Pages.
Zhou, et al., "Multi-Projector Display with Continuous Self-Calibration", In Proceedings of the 5th ACM/IEEE International Workshop on Projector Camera Systems, Aug. 2008, 7 Pages.
"Final Office Action Issued in U.S. Appl. No. 13/074,041", Mailed Date: Oct. 9, 2014, 25 Pages.
"Final Office Action Issued in U.S. Appl. No. 13/074,041", Mailed Date: Jan. 8, 2014, 23 Pages.
"Non Final Office Action Issued in U.S. Appl. No. 13/074,041", Mailed Date: Jun. 23, 2014, 21 Pages.
"Non Final Office Action Issued in U.S. Appl. No. 13/074,041", Mailed Date: Apr. 2, 2015, 19 Pages.
"Non Final Office Action Issued in U.S. Appl. No. 13/074,041", Mailed Date: Feb. 1, 2013, 22 Pages.
"Non Final Office Action Issued in U.S. Appl. No. 13/074,041", Mailed Date: Aug. 23, 2013, 20 Pages.
"Notice of Allowance Issued in U.S. Appl. No. 13/074,041", Mailed Date: Sep. 16, 2015, 5 Pages.
"Response to Final Office Action Mailed Date Jan. 8, 2014 in U.S. Appl. No. 13/074,041", Filed Date: Apr. 30, 2014, 19 Pages.
"Response to Non-Final Office Action Mailed Date Aug. 23, 2013 in U.S. Appl. No. 13/074,041", Filed Date: Dec. 3, 2013, 19 Pages.
"Response to Non-Final Office Action Mailed Date Feb. 1, 2013 in U.S. Appl. No. 13/074,041", Filed Date: May 29, 2013, 15 Pages.
"Response to Non-Final Office Action Mailed Date Jun. 23, 2014 in U.S. Appl. No. 13/074,041", Filed Date: Sep. 23, 2014, 16 Pages.
"Response to Non-Final Office Action Mailed date Oct. 9, 2014 in U.S. Appl. No. 13/074,041", Filed Date: Jan. 9, 2015, 15 Pages.
"Response to Office Action mailed Date Apr. 2, 2015 in U.S. Appl. No. 13/074,041", Filed Date: Aug. 21, 2015, 14 Pages.
"Final Office Action Issued in U.S. Appl. No. 13/084,786", Mailed Date: Nov. 27, 2015, 22 Pages.
"Final Office Action Issued in U.S. Appl. No. 13/084,786", Mailed Date: Jul. 17, 2013, 27 Pages.
"Non Final Office Action Issued in U.S. Appl. No. 13/084,786", Mailed Date: Jul. 8, 2015, 29 Pages.
"Non Final Office Action Issued in U.S. Appl. No. 13/084,786", Mailed Date: Mar. 12, 2013, 24 Pages.
"Response to Final Office Action mailed Date Jul. 17, 2013 in U.S. Appl. No. 13/084,786", Filed Date: Oct. 17, 2013, 16 Pages.
"Response to Non-Final Office Action mailed Date Mar. 12, 2013 in U.S. Appl. No. 13/084,786", Filed Date: Jun. 12, 2013, 13 Pages.
"Final Office Action Issued in U.S. Appl. No. 13/155,422", Mailed Date: Aug. 16, 2013, 22 Pages.
"Non-final Office Action Issued in U.S. Appl. No. 13/155,422", Mailed Date: Apr. 11, 2014, 9 Pages.
"Non-final Office Action Issued in U.S. Appl. No. 13/155,422", Mailed Date: Mar. 26, 2015, 19 Pages.
"Non-final Office Action Issued in U.S. Appl. No. 13/155,422", Mailed Date: Dec. 20, 2012, 10 Pages.
"Notice of Allowance Issued in U.S. Appl. No. 13/155,422", Mailed Date: Aug. 15, 2014, 8 Pages.
"Notice of Allowance Issued in U.S. Appl. No. 13/155,422", Mailed Date: Sep. 15, 2015, 11 Pages.
"Response to Final Office Action mailed Date Aug. 16, 2013 in U.S. Appl. No. 13/155,422", Filed Date: Nov. 15, 2013, 12 Pages.
"Response to Non-Final Office Action mailed Date Apr. 11, 2014 in U.S. Appl. No. 13/155,422", Filed Date: Jul. 11, 2014, 11 Pages.
"Response to Non-Final Office Action mailed Date Dec. 20, 2012 in U.S. Appl. No. 13/155,422", Filed Date: Apr. 22, 2013, 12 Pages.
"Response to Non-Final Office Action mailed Date Mar. 26, 2015 in U.S. Appl. No. 13/155,422", Filed Date: Jul. 22, 2015, 12 Pages.
"Non-final Office Action Issued in U.S. Appl. No. 13/851,797", Mailed Date: Apr. 10, 2014, 22 Pages.
"Notice of Allowance Issued in U.S. Appl. No. 13/851,797", Mailed Date: Dec. 5, 2014, 13 Pages.
"Notice of Allowance Issued in U.S. Appl. No. 13/851,797", Mailed Date: Aug. 21, 2014, 10 Pages.
"Notice of Allowance Issued in U.S. Appl. No. 13/851,797", Mailed Date: Mar. 24, 2015, 10 Pages.
"Notice of Allowance Issued in U.S. Appl. No. 13/851,797", Mailed Date: Jul. 6, 2015, 10 Pages.
"Notice of Allowance Issued in U.S. Appl. No. 13/851,797", Mailed Date: Nov. 5, 2015, 10 Pages.
"Response to Non-Final Office Action Mailed Date Apr. 10, 2014 in U.S. Appl. No. 13/851,797", Filed Date: Jun. 16, 2014, 14 Pages.
"Final Office Action Issued in U.S. Appl. No. 14/037,986", Mailed Date: Nov. 18, 2015, 24 Pages.
"Non-final Office Action Issued in U.S. Appl. No. 14/037,986", Mailed Date: Apr. 27, 2015, 21 Pages.
"Decision on Re-examination Issued in Chinese Patent Application No. 200980139375.3", Mailed Date: Jan. 28, 2015, 11 Pages.
"Final Office Action Issued in Chinese Patent Application No. 200980139375.3", Mailed Date: Jan. 8, 2014, 10 Pages.
"First Office Action Issued in Chinese Patent Application No. 200980139375.3", Mailed Date: Dec. 18, 2012, 14 Pages.
"Notice of Allowance Issued in Chinese Patent Application No. 200980139375.3", Mailed Date: Mar. 2, 2015, 4 Pages.
"Office Action Issued in Chinese Patent Application No. 200980139375.3", Mailed Date: Aug. 7, 2014, 5 Pages.
"Response and Request for Reexamination to the Third Office Action Issued in Chinese Patent Application No. 200980139375.3 dated Jan. 8, 2014", Filed Date: Apr. 8, 2014, 11 Pages.
"Response to Notice of Re-examinatin Mailed Aug. 7, 2014 in Chinese Patent Application No. 200980139375.3", Filed Date: Oct. 9, 2014, 11 Pages.
"Response to the First Office Action Dated Dec. 18, 2012 for Chinese Patent Application No. 200980139375.3", Filed Date: Apr. 19, 2013, 14 Pages.
"Response to the Second Office Action Dated Aug. 7, 2013 for Chinese Patent Application No. 200980139375.3", Filed Date: Aug. 30, 2013, 15 Pages.
"Second Office Action Issued in Chinese Patent Application No. 200980139375.3", Mailed Date: Aug. 7, 2013, 12 Pages.
"Notice of Allowance Issued in Japanese Patent Application No. 2011-530082", Mailed Date: Aug. 5, 2014, 3 Pages.

(56) References Cited

OTHER PUBLICATIONS

"Office Action Issued in Japanese Patent Application No. 2011-530082", Mailed Date: Oct. 1, 2013, 8 Pages.
"Office Action Issued in Japanese Patent Application No. 2011-530082", Mailed Date: Mar. 11, 2014, 8 Pages.
"Response to Office Action Dated Mar. 11, 2014 for Japanese Application No. 2011-530082", Filed Date: Jul. 10, 2014, 6 Pages.
"Response to Office Action Dated Oct. 1, 2013 for Japanese Application No. 2011-530082", Filed Date: Dec. 26, 2013, 11 Pages.
"First Office Action Issued in Chinese Patent Application No. 201180010523.9", Mailed Date: Jun. 20, 2013, 14 Pages.
"Notice of Allowance Issued in Chinese Patent Application No. 201180010523.9", Mailed Date: Jan. 21, 2014, 6 Pages.
"Voluntary Amendment in Chinese Patent Application No. 201210037666.5", Filed Date: May 29, 2014, 13 Pages.
"Notice of Allowance Issued in Japenese Patent Application No. 2012-555036", Mailed Date: Apr. 21, 2015, 3 Pages.
"Office Action Issued in Japanese Patent Application No. 2012-555036", Mailed Date: Dec. 4, 2014, 4 Pages.
"Office Action Issued in Japanese Patent Application No. 2014-142550", Mailed Date: Aug. 25, 2015, 8 Pages.
"Office Action Issued in Japanese Patent Application No. 2014-142551", Mailed Date: Aug. 18, 2015, 8 Pages.
Agarawala, et al., "Keepin' It Real: Pushing the Desktop Metaphor with Physics, Piles and the Pen", In Proceedings of the SIGCHI Conference on Human Factors in Computing Systems, Apr. 2006, pp. 1283-1292.
Anderson, et al., "Tangible Interaction+ Graphical Interpretation: A New Approach to 3D Modeling", In Proceedings of the 27th Annual Conference on Computer Graphics and Interactive Techniques, Apr. 2000, 14 Pages.
Ashdown, et al., "Steerable Projector Calibration", In IEEE Computer Society Conference on Computer Vision and Pattern Recognition—Workshops, Published on Jun. 2005, 8 Pages.
Taiwan Intellectual Property Office, Office Action and Search Report issued in Taiwan Patent Application No. 101107044, Nov. 12, 2015, Taiwan, 10 pages. (Submitted with translation of Search Report).
"Auto Yoke The First Automated Lighting Solution Designed for Theatrical Use", Retrieved from <<http://web.archive.org/web/20120309060116/http://www.citytheatrical.com/rcyoke.htm>>, Retrieved on Mar. 9, 2012, 2 Pages.
"Dynamical simulation", Retrieved on <<https://en.wikipedia.org/wiki/Dynamical_simulation>>, Wikipedia entry, Retrieved on Mar. 9, 2011, 4 Pages.
"Great Films Fill Rooms", Retrieved from <<http://greatfilmsfillrooms.com/en/>>, Retrieved on Feb. 19, 2013, 1 Page.
"Microsoft Office Labs", Retrieved from <<http://www.microsoft.com/office/labs/index.html>>, Retrieved on Feb. 19, 2013, 7 Pages.
"Microsoft Surface", Retrieved from <<http://www.surface.com>>, Retrieved on: Jan. 7, 2009, 1 Page.
"Newton Game Dynamics", Retrieved from <<http://web.archive.org/web/20130222075951/http://newtondynamics.com/forum/newton.php>>, Retrieved on Feb. 22, 2013, 2 Pages.
"Optimus Maximus Keyboard", Retrieved from <<http://web.archive.org/web/20090105063004/http://www.artlebedev.com/everything/optimus/>>, Jan. 5, 2009, 5 Pages.
"Physics engine", Retrieved on <<https://en.wikipedia.org/wiki/Physics_engine>>, Retrieved on Mar. 9, 2011, 7 Pages.
"Sketching User Experiences", Retrieved from <<http://www.billbuxton.com/>>, Retrieved on: Jan. 7, 2009, 6 Pages.
"Steerable Augmented Reality with the Beamatron", Retrieved from <<http://research.microsoft.com/en-us/um/people/awilson/publications/WilsonUIST2012/WilsonUIST2012.html>>, Retrieved on Oct. 2012, 1 Page.
"Decision to Refuse Issued in European Patent Application No. 11747870.1", Mailed Date: Jun. 3, 2015, 4 Pages.
"Office Action Issued in European Patent Application No. 11747870.1", Mailed Date: May 23, 2014, 7 Pages.
"Response to Office Action in European Patent Application No. 11747870.1", Submitted Date: Jun. 25, 2014,10 Pages.
"Summons to Oral Proceedings Issued in European Patent Application No. 11747870.1", Mailed Date: Nov. 10, 2014, 9 Pages.
"Supplementary Search Report Issued in European Patent Application No. 11747870.1", Mailed Date: May 13, 2014, 3 Pages.
"Applicant-Initiated Interview Summary in U.S. Appl. No. 12/241,281", Mailed Date: Nov. 9, 2011, 3 Pages.
"Applicant-Initiated Interview Summary in U.S. Appl. No. 12/241,281", Mailed Date: Mar. 22, 2012, 3 Pages.
"Applicant-Initiated Interview Summary in U.S. Appl. No. 12/241,281", Mailed Date: Sep. 20, 2012, 3 Pages.
"Final Office Action Issued in U.S. Appl. No. 12/241,281", Mailed Date: Jan. 6, 2012, 27 Pages.
"Non-final Office Action Issued in U.S. Appl. No. 12/241,281", Mailed Date: Jul. 20, 2012, 21 Pages.
"Non-final Office Action Issued in U.S. Appl. No. 12/241,281", Mailed Date: Aug. 25, 2011, 26 Pages.
"Notice of Allowance Issued in U.S. Appl. No. 12/241,281", Mailed Date: Dec. 24, 2012, 10 Pages.
"Response to Final Office Action mailed Date Jan. 8, 2014 in U.S. Appl. No. 12/241,281", Filed Date: Apr. 30, 2014, 16 Pages.
"Response to Final Office Action mailed Date Jan. 6, 2012 in U.S. Appl. No. 12/241,281", Filed Date: May 2, 2012, 11 Pages.
"Response to Non-Final Office Action mailed Date Aug. 23, 2013 in U.S. Appl. No. 12/241,281", Filed Date: Dec. 3, 2013, 19 Pages.
"Response to Non-Final Office Action mailed Date Aug. 25, 2011 in U.S. Appl. No. 12/241,281", Filed Date: Nov. 2, 2011, 13 Pages.
"Response to Non-Final Office Action mailed Date Feb. 1, 2013 in U.S. Appl. No. 12/241,281", Filed Date: May 29, 2013, 15 Pages.
"Response to Non-Final Office Action mailed Date Jul. 20, 2012 in U.S. Appl. No. 12/241,281", Filed Date: Oct. 22, 2012, 13 Pages.
"Response to Restriction Requirement Mailed Date Jun. 21, 2011 in U.S. Appl. No. 12/241,281", Filed Date: Jul. 20, 2011, 7 Pages.
"Restriction Requirement Issued in U.S. Appl. No. 12/241,281", Mailed Date: Jun. 21, 2011, 7 Pages.
"Final Office Action Issued in U.S. Appl. No. 12/819,230", Mailed Date: May 9, 2013, 20 Pages.
"Non-Final Office Action Issued in U.S. Appl. No. 12/819,230", Mailed Date: Dec. 24, 2012, 18 Pages.
"Notice of Allowance Issued in U.S. Appl. No. 12/819,230", Mailed Date: Jan. 8, 2014, 9 Pages.
"Supplementary Search Report for European Patent Application No. 12752325.6", Mailed Date: Jul. 25, 2014, 4 Pages.
"Final Office Action Issued in U.S. Appl. No. 13/039,179", Mailed Date: Nov. 5, 2014, 25 Pages.
"Non Final Office Action Issued in U.S. Appl. No. 13/039,179", Mailed Date: Jul. 2, 2014, 24 Pages.
"Non Final Office Action Issued in U.S. Appl. No. 13/039,179", Mailed Date: Nov. 29, 2013, 22 Pages.
Klemmer, et al., "The Designers' Outpost: A Task-Centered Tangible Interface for Web Site Information Design", In Extended Abstracts on Human Factors in Computing Systems, Apr. 2000, 10 Pages.
Koike, et al., "Integrating Paper and Digital Information on Enhanced Desk: A Method for Realtime Finger Tracking on an Augmented Desk System", In ACM Transaction on Computer-Human Interaction, vol. 8, Issue 4, Dec. 2001, pp. 307-322.
Koshimizu, et al., "SnapTable: Physical Handling for Digital Documents with Electronic Paper", In Proceedings of the Third Nordic Conference on Human-computer Interaction, Oct. 2004, pp. 401-404.
Lange, et al., "Insight lab: An Immersive Team Environment Linking Paper, Displays, and Data", In Proceedings of the Conference on Human Factors in Computing Systems, Jan. 1998, pp. 550-557.
Lavoie, et al., "Constructing 3D Virtual Reality Objects from 2D Images of Real Objects Using NURBS", In Proceedings of IEEE Symposium on Human-Computer Interfaces and Measurement Systems,Virtual Environments 2007, VECIMS 2007., Published on Jun. 25, 2007, pp. 117-124.

(56) References Cited

OTHER PUBLICATIONS

Leibe, et al., "The Perceptive Workbench: Toward Spontaneous and Natural Interaction in Semi-Immersive Virtual Environments", In Proceedings of the IEEE Virtual Reality Conference, Mar. 2000, 4 Pages.

Leibe, et al., "Toward Spontaneous Interaction with the Perceptive Workbench", In Proceedings of IEEE Computer Graphics and Applications, vol. 20 , Issue: 6, Published on Nov. 2000,pp. 54-65.

Leith Inger, et al., "Improving Menu Interaction for Cluttered Tabletop Setups with User-Drawn Path Menus", In Second Annual IEEE International Workshop on Horizontal Interactive Human-Computer System, Oct. 2007, pp. 121-128.

Leiva, et al., "3D Reconstruction of a Static Indoor Environment by Fusion of Sonar and Video Data", In Proceedings of International Symposium on Intelligent Robotics Systems. 2001., Jul. 18, 2001, 10 Pages.

Levy, Steven, "Google Gets Transparent with Glass, Its Augmented Reality Project", Retrieved from <<http://www.wired.com/2012/04/epicenter-google-glass-ar/>>, Published on Apr. 4, 2012, 4 Pages.

Liao, et al., "PapierCraft: A Command System for Interactive Paper", In Proceedings of the 18th Annual ACM symposium on User Interface Software and Technology. ACM, 2005., Oct. 23, 2005, 4 Pages.

Lin, et al. "DENIM: Finding a Tighter Fit Between Tools and Practice for Web Site Design", In Proceedings of the SIGCHI Conference on Human Factors in Computing Systems, Apr. 2000, pp. 510-517.

Luus, Rein, et al., "Optimization by Direct Search and Systematic Reduction of the Size of Search Region", In American Institute of Chemical Engineering Journal. vol. 19. No. 4, Published on Jul. 1973, 7 Pages.

Izadi, et al., "KinectFusion: Real-time 3D Reconstruction and Interaction Using a Moving Depth Camera", In Proceedings of the 24th Annual ACM Symposium on User Interface Software and Technology, Published on Oct. 16, 2011, 10 Pages.

Matsushita, et al., "HoloWall: Designing a Finger; Hand, Body, and Object Sensitive Wall", In Proceedings of the 10th Annual ACM Symposium on User Interface Software and Technology, Oct. 1997, pp. 209-210.

Moggridge, Bill, "Designing Interactions", Table of Contents, Book published by MIT Press, Retrieved from <<http://www.designinginteractions.com/chapters>>, Retrieved on: Aug. 1, 2009, 1 Page.

Molyneaux, et al., "Cooperative Augmentation of Smart Objects with Projector-Camera Systems", In The 9th International Conference on Ubiquitous Computing, Published on Sep. 16, 2007, 18 Pages.

Molyneaux, David, et al., "Interactive Environment-Aware Handheld Projectors for Pervasive Computing Spaces", In Proceedings of the 1oth International Conference on Pervasive Computing, Published on Jun. 18, 2012, 18 Pages.

Moraveji, et al., "Mischief: Supporting Remote Teaching in Developing Regions", In Proceedings of the Twenty-Sixth Annual SIGCHI Conference on Human Factors in Computing Systems, Apr. 2008, pp. 353-362.

Nakashima, et al., "An Integrated 2D-3D Work Environment for Cooperative Modeling", The Technical Report of the Institute of Image Information and Television Engineers, Japan,, Feb. 2, 2004, pp. 41-46.

Newman, et al., "Sitemaps, Storyboards, and Specifications: A Sketch of Web Site Design Practice", In Proceedings of the 3rd Conference on Designing Interactive Systems: Processes, Practices, Methods, and Techniques, Aug. 2000, pp. 263-274.

Ngan, et al., "Calibrating a Pan-Tilt Camera Head", In Image and Vision Computing Workshop, Published on Dec. 1995, 6 Pages.

Nguyen, et al., "Depth Image-based Rendering from Multiple Cameras with 3D Propagation Algorithm", In Proceedings of the 2nd International Conference on Immersive Telecommunications, May 2009, 6 Pages.

Ohta, et al., "Share-Z: ClienUServer Depth Sensing for See-Through Head Mounted Displays", In Journal of Presence: Teleoperators and Virtual Environments—Mixed Reality, Apr. 2002, 9 Pages.

Olsen, et al., "Spilling: Expanding Hand Held Interaction to Touch Table Displays", In Second Annual IEEE International Workshop on Horizontal Interactive Human-Computer System, Oct. 2007, pp. 163-170.

"TractorBeam: Seamless Integration of Local and Remote Pointing for Tabletop Displays", In Proceedings of Graphics Interface, May 2005, pp. 33-40.

"Sensetable: A Wireless Object Tracking Platform for Tangible User Interfaces", In Proceedings of CHI, Mar. 2001, 8 Pages.

"International Search Report & Written Opinion for PCT Application No. PCT/US12/24786", Mailed Date: Oct. 18, 2012, 8 Pages.

"International Search Report and Written Opinion Issued in PCT Application No. PCT/US2009/054607", Mailed Date: Apr. 6, 2010, 11 Pages.

"International Preliminary Report on Patentability for PCT Patent Application No. PCT/US2011/024925", Mailed Date: Sep. 7, 2012, 6 Pages.

"International Search Report & Written Opinion for PCT Application No. PCT/US2011/024925", Mailed Date: Oct. 24, 2011, 11 Pages.

"Augmenting Reality with Projected Interactive Displays", In Proceedings of the International Symposium on Virtual and Augmented Architecture, Published on Jun. 21, 2001, 9 Pages.

"The Everywhere Displays Projector: A Device to Create Ubiquitous Graphical Interfaces", In Proceedings of the 3rd International conference on Ubiquitous Computing, Published on Sep. 30, 2001, 18 Pages.

"Illuminating Clay: A 3-D Tangible Interface for Landscape Analysis", In Proceedings of the SIGCHI Conference on Human Factors in Computing Systems, Apr. 2002, pp. 355-362.

Raffle, et al., "Topobo: A Constructive Assembly System with Kinetic Memory", In Proceedings of the SIGCHI Conference on Human Factors in Computing Systems, CHI '04, Published on Apr. 25, 2004, pp. 647-654.

Raskar, et al., "iLamps: Geometrically Aware and Self-Configuring Projectors", In Special Interest Group on Computer Graphics and Interactive Techniques Conference, Published on Jul. 2006, 10 Pages.

Raskar, et al. ,"Multi-Projector Displays Using Camera-Based Registration", In Proceedings of the conference on Visualization '99, Published on Oct. 24, 1999, 9 Pages.

Raskar, et al., "Shader lamps: Animating Real Objects with Image-Based Illumination", In Proceedings of the 12th Eurographics Workshop on Rendering Techniques, Published on Jun. 26, 2001, 10 Pages.

Raskar, et al., "The Office of the Future: A Unified Approach to Image-Based Modeling and Spatially Immersive Displays", In Proceedings of the 25th annual conference on Computer Graphics and Interactive Techniques, Published on Jul. 27, 1998, 10 Pages.

Rekimoto, et al., "Augmented Surfaces: A Spatially Continuous Work Space for Hybrid Computing Environments", In Proceedings of the SIGCHI Conference on Human Factors in Computing Systems, May 1999, pp. 378-385.

Rekimoto, et al., "Data Tiles: A Modular Platform for Mixed Physical and Graphical Interactions", In Proceedings of the SIGCHI Conference on Human Factors in Computing Systems, Mar. 2001, pp. 269-276.

Scheibe, et al., "Data Fusion and Visualization of Panoramic Images and Laser Scans", In ISPRS Working Group V/1, Panoramic Photogrammetry Workshop. 2004, Feb. 19, 2004, 8 Pages.

Segal, et al., "Fast shadows and lighting effects using texture mapping", In Proceedings of the 19th annual conference on Computer graphics and interactive techniques, SIGGRAPH '92, Published on Jul. 1, 1992, pp. 249-252.

Sequeira, et al., "3D Reconstruction of Indoor Environments", In Proceedings of International Conference on Image Processing, vol. 1, Sep. 16, 1996, 4 Pages.

(56) References Cited

OTHER PUBLICATIONS

Shen, et al., "DiamondSpin: An Extensible Toolkit for Around-the-Table Interaction", In Proceedings of the SIGCHI Conference on Human Factors in Computing Systems, Apr. 2004, pp. 167-174.

Sodhi, et al., "Kinect-Projector Calibration", CS 498 Computational Photography—Final Project, University of Illinois at Urbana-Champaign, Published on Dec. 14, 2010, 11 Pages.

Sodhi, et al."Lightguide: Projected Visualizations for Hand Movement Guidance", In Proceedings of the SIGCHI Conference on Human Factors in Computing Systems, Published on May 5, 2012, 10 Pages.

Sokoler, et al., "Physically Embodied Video Snippets Supporting Collaborative Exploration of Video Material During Design Sessions", In Proceedings of the Second Nordic Conference on Human-Computer Interaction, Oct. 2002, pp. 139-148.

Starner, et al., "The Perceptive Workbench: Computer-vision-based Gesture Tracking, Object Tracking, and 3D Reconstruction for Augmented Desks", In Machine Vision and Applications, Apr. 2003, 13 Pages.

Subrahmanian, et al., "Boundary Objects and Prototypes at the Interfaces of Engineering Design", In Journal of Computer Supported Cooperative Work, vol. 12 Issue 2, May 2003, 2 Pages.

\* cited by examiner

IMMERSIVE DISPLAY WITH PERIPHERAL ILLUSIONS

CROSS REFERENCE TO RELATED APPLICATIONS

This application claims priority to U.S. Provisional Application No. 61/749,779, filed Jan. 7, 2013, and titled IMMERSIVE DISPLAY WITH PERIPHERAL ILLUSIONS, and is a continuation-in-part of U.S. Utility application Ser. No. 13/039,179, filed Mar. 2, 2011, and titled IMMERSIVE DISPLAY EXPERIENCE, the above applications are hereby incorporated herein by reference in their entireties for all purposes.

BACKGROUND

User enjoyment of video games and other media experiences can be increased by making the experience more realistic. Previous attempts to make the experience more realistic have included switching from two-dimensional to three-dimensional animation techniques, increasing the resolution of game graphics, producing improved sound effects, and creating more natural game controllers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A primary display displays a primary image. A peripheral illusion is displayed around the primary display by an environmental display so that the peripheral illusion appears as an extension of the primary image.

DETAILED DESCRIPTION

The present disclosure is directed to the display of peripheral images around a primary display. In particular, a variety of different peripheral illusions that may be achieved by displaying peripheral images around a primary display are disclosed. According to embodiments of the present disclosure, the area surrounding a primary display may be augmented with visualizations to enhance traditional gaming or other viewing experiences. Visualizations in the periphery can enhance, negate, or distort the existing physical environment and thus enhance the content displayed on the primary display. Such peripheral illusions can change the appearance of the room, induce apparent motion, extend the field of view, and/or enable entirely new game or viewing experiences.

Peripheral illusions may also be used with broadcast videos. As an example, a primary or secondary broadcaster may send additional information to an environmental display that is synchronized with the main broadcast so as to allow for concurrent viewing of a main broadcast and additional information related to that broadcast. Examples of additional information may include maps, commentaries, chats, viewer statistics, etc.

Figure 1:
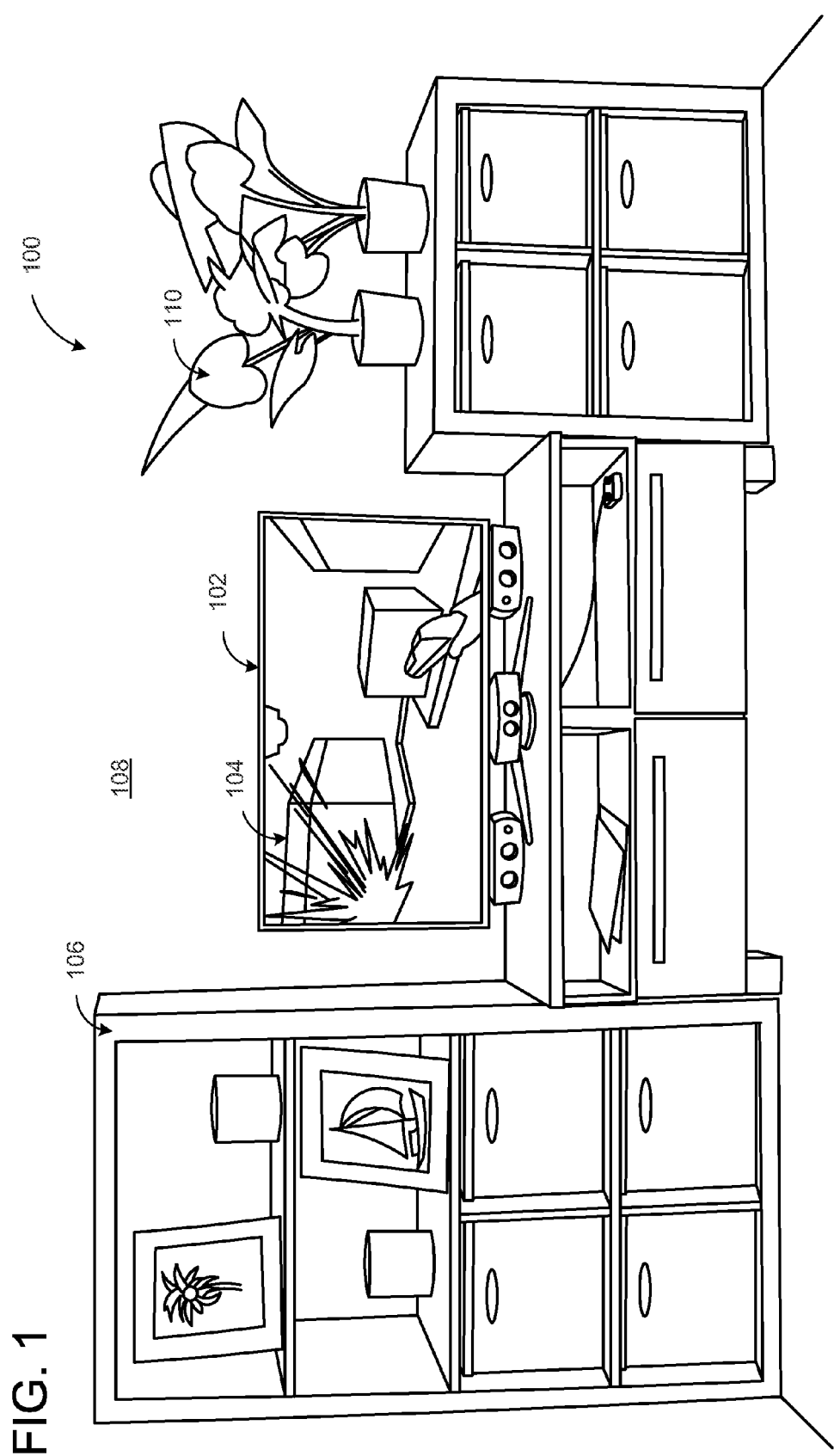
FIG. 1 shows an example display environment including a primary display.

FIG. 1 shows an example display environment 100 in which an immersive display experience may be provided. The environment includes a primary display 102 (e.g., television) used to display a primary image (e.g., primary image 104 of primary display 102), and a display environment including several objects (e.g., bookcase 106, wall 108, and plant 110).

Figure 2:
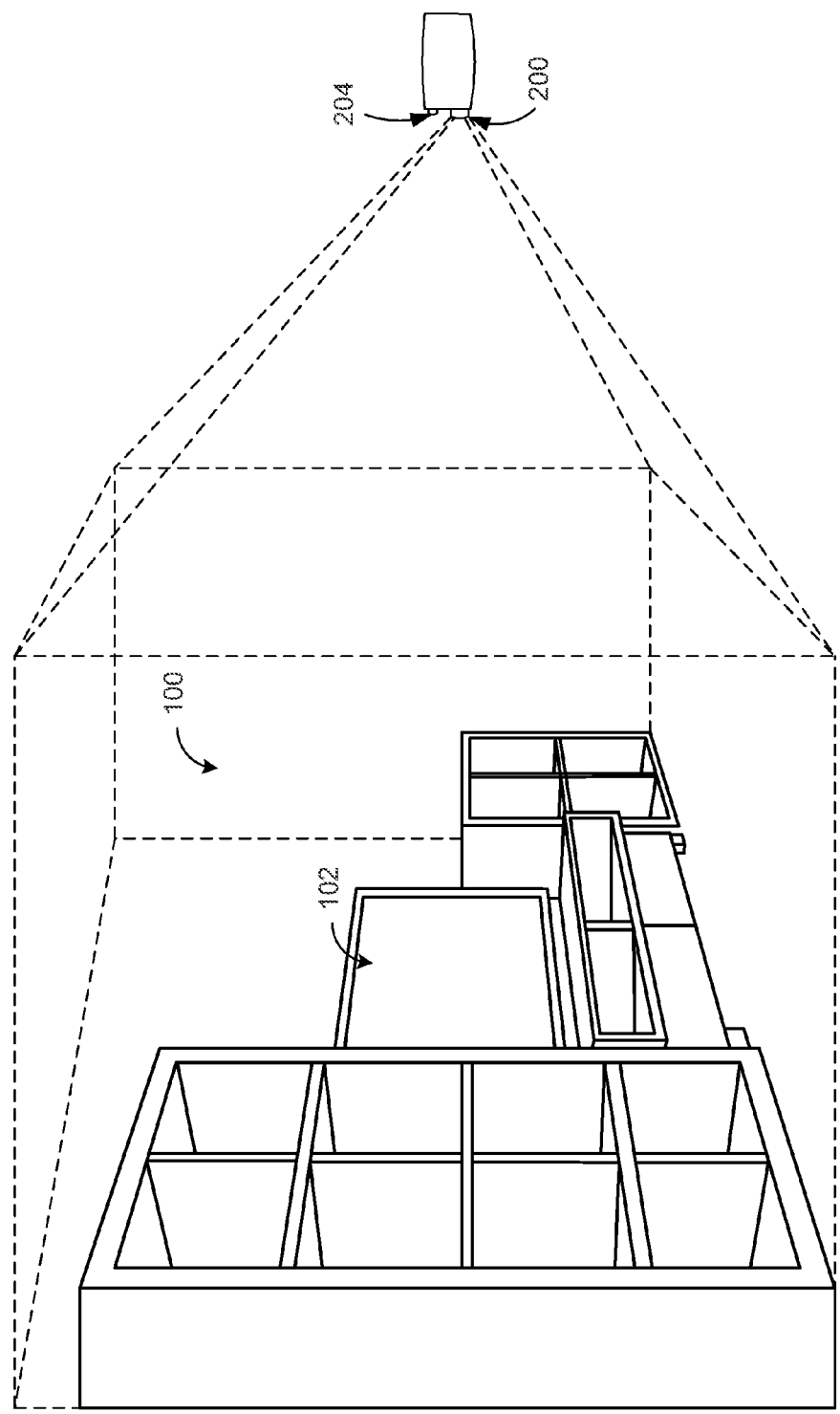
FIG. 2 shows the display environment of FIG. 1 including an environmental display and the primary display.

FIG. 2 shows an example environmental display 200 used to display a peripheral illusion in display environment 100. A peripheral image from the environmental display 200 may be projected as a peripheral illusion around the primary display 102 so that the peripheral illusion appears as an extension of the primary image displayed by the primary display.

It is to be understood that peripheral illusions may be displayed for a user using a variety of different display technologies without departing from the scope of this disclosure. Environmental display 200 may include a projector, a wide-angle projector, an ultra-wide field of view projector, a 360 degree field of view projector, or a combination of two or more different projectors. When one or more projectors are used, such projectors may be positioned at a variety of different locations without departing from the scope of this disclosure. As one non-limiting example, a projector may be placed in front of or behind a user so as to project light in the general direction of a primary display. The projector can be directly connected to a gaming console or other video driver as a secondary display.

As another example, a see-through display may be used to display augmented reality images that appear to be around a primary display when a user views the primary display through the see-through display.

In still other embodiments, large secondary OLED displays mounted around a primary display (e.g., on the wall), specialized laser projectors, and/or other secondary displays may be used. In general, any secondary display capable of adding visual stimuli around a primary display may be used.

FIG. 2 also shows a sensor 204 that may be used to model the geometry, color, ambient lighting conditions, and/or other aspects of display environment 100. Sensor 204 may include a depth camera (e.g., structured light, time-of-flight, stereoscopic, or other depth camera), a color camera, a microphone, and/or other subsensors.

Sensor 204 may be used to determine a position of primary display 102 within display environment 100. As such, the environmental display can mask the primary display so that projected images are displayed around the primary display without projecting images directly onto the primary display. Other objects may be similarly masked. Furthermore, geometric, color, and lighting information may be determined so that geometric-, color-, and/or lighting-corrected images may be perceived by the viewer. When the environmental display takes the form of a see-through display, a sensor may be integrated with the see-through display, thus allowing augmented reality images to be real-time masked, geometric-, color-, and/or lighting corrected.

Calibration of the system enables illusions to tightly match the on-screen content. For example, in embodiments that utilize one or more projectors, the calibration of the system may include two steps, which may be performed automatically: calibrating the projector to the sensor and calibrating the location of the primary display in the peripheral image. These steps may be achieved by displaying test images at different locations with the environmental and primary displays, respectively, and recognizing where the images appear in the sensor's field of view. It is important to note that the sensor may only be used during calibration, and thus in embodiments where the sensor is separable from the environmental display, the user may move the sensor if the physical configuration of the room does not change after calibration. In some embodiments, a sensor may be used continuously to allow for real-time changes in room geometry (e.g., moving furniture or people in the scene). The sensor optionally may be integrated with the environmental display. It is to be understood that any suitable calibration technique may be used without departing from the scope of this disclosure.

In addition to calibration, the acquired 3D image of the scene geometry may be used to demonstrate illusions that respond in a physically realistic manner to people, furniture, and/or other objects in the display environment.

The immersive display systems described herein are capable of presenting a variety of peripheral illusions in real-time while augmenting video games or other video content (e.g., television, movies, sports, webpages, home movies, broadcast television etc.). Peripheral illusions may take advantage of the fact that the illusions occur in the peripheral vision of the user. Illusions that may not seem realistic when a user is focusing on the illusions may be quite effective in the user's peripheral vision. Many illusions focus primarily on introducing motion in the user's peripheral vision as opposed to accurately reproducing a certain color. Furthermore, many illusions leverage the notion that nudging the existing surface color may be more effective than trying to reproduce an arbitrary surface color. In some embodiments, the peripheral illusions may be directed to an area immediately surrounding a primary display (e.g., all or part of one wall in a room). In other embodiments, peripheral illusions may be projected around a greater field of view, up to and including the entire room. The quality of peripheral illusions may optionally be drawn as a function of the current field of view of the viewers (e.g., peripheral illusions closer to a viewer's focus may be drawn with higher quality than peripheral illusions farther from a viewer's focus).

Peripheral illusions that augment the physical reality of the display environment, rather than replacing it, offer the advantage of enhancing the realism of the virtual world by causing it to interact with the physical reality around the primary display. In this case, the viewer knows that objects in her immediate surrounding are real and the reality of the game can seem more realistic due to changes in the physical reality that correspond to events that occur in the virtual reality.

Peripheral illusions that only modify the existing surface color and not the geometry of the room are view independent, and can be viewed from multiple users from any position within the room. Illusions that add to or modify the geometry of the room are inherently view dependent and work best from a fixed point within the room. However, even view-dependent illusions typically have a rather large sweet spot from which the illusions remain effective. Additionally, projective texturing techniques may be used to move the view dependent sweet spot about a room such that the view dependent sweet spot is a location where a viewer is likely to be sitting. Generally, the more complex the room's furniture and the more geometry that is modified virtually, the more view dependent the effect.

FIGS. 3-7 show example peripheral illusions. It is to be understood that the illustrated illusions are provided as examples and are in no way intended to be limiting. Games, video, and/or other viewing experiences may be enhanced with a variety of different peripheral illusions displayed around a primary display without departing from the scope of this disclosure.

Figure 3:
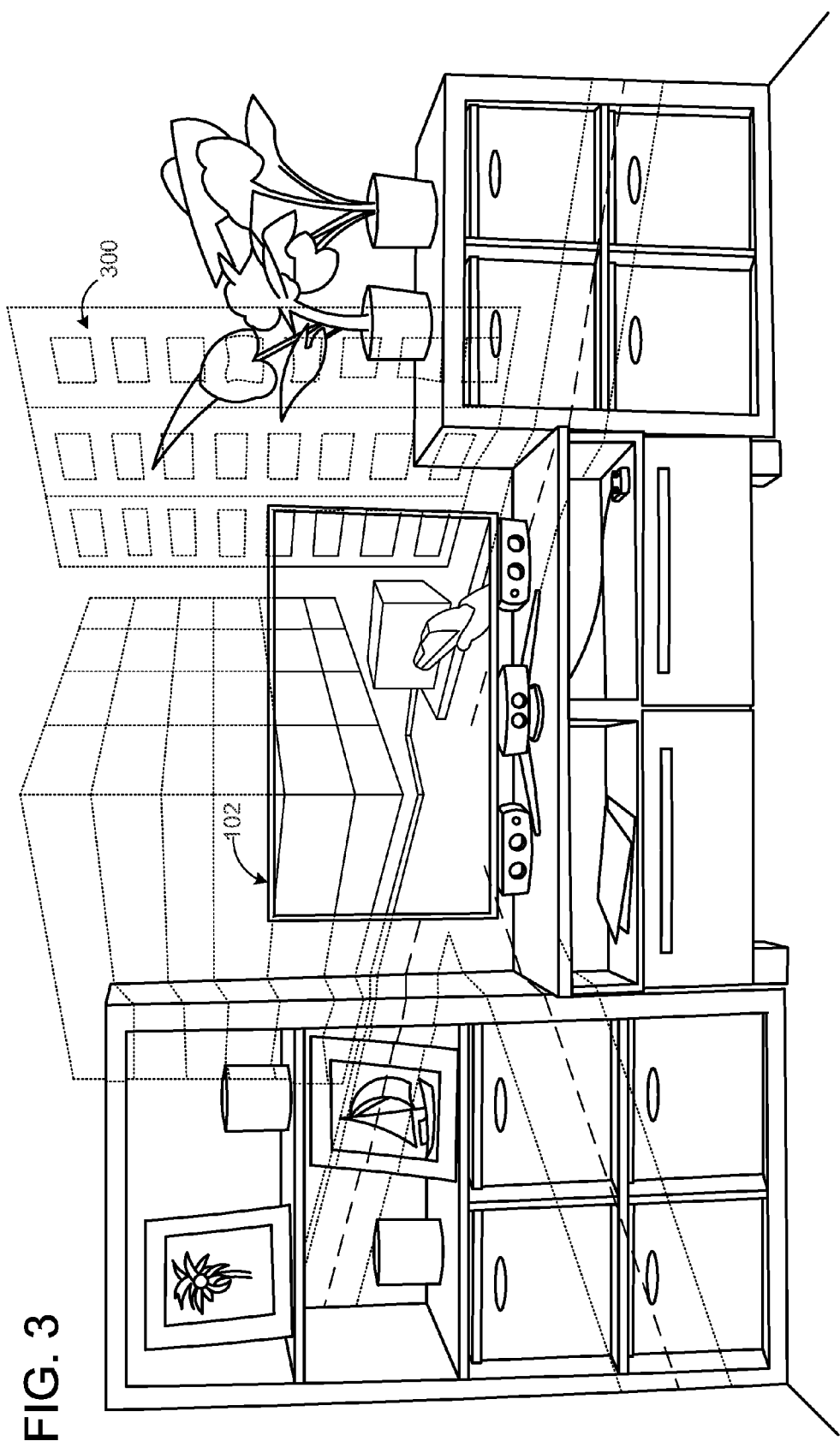
FIGS. 3-7 show the display environment of FIG. 1 as it appears when different peripheral illusions are displayed around the primary display by an environmental display.

FIG. 3 shows a peripheral illusion 300 that increases immersion by extending the content from the primary display out into the room, replacing the physical reality with a game's reality. The peripheral illusion 300 may include a full color extension of the primary image, and/or an extension of high contrast edges of the primary image. In general, the peripheral illusion increases the effective screen size of the primary display by extending images from the primary display out into the rest of the room.

A peripheral image may be projected onto non-flat, non-white projection surfaces with geometric and/or color compensation. As stated above, the ability to compensate for the existing surface color may be limited, and this effect may be enhanced when a user is still focusing on the primary display.

Figure 4:
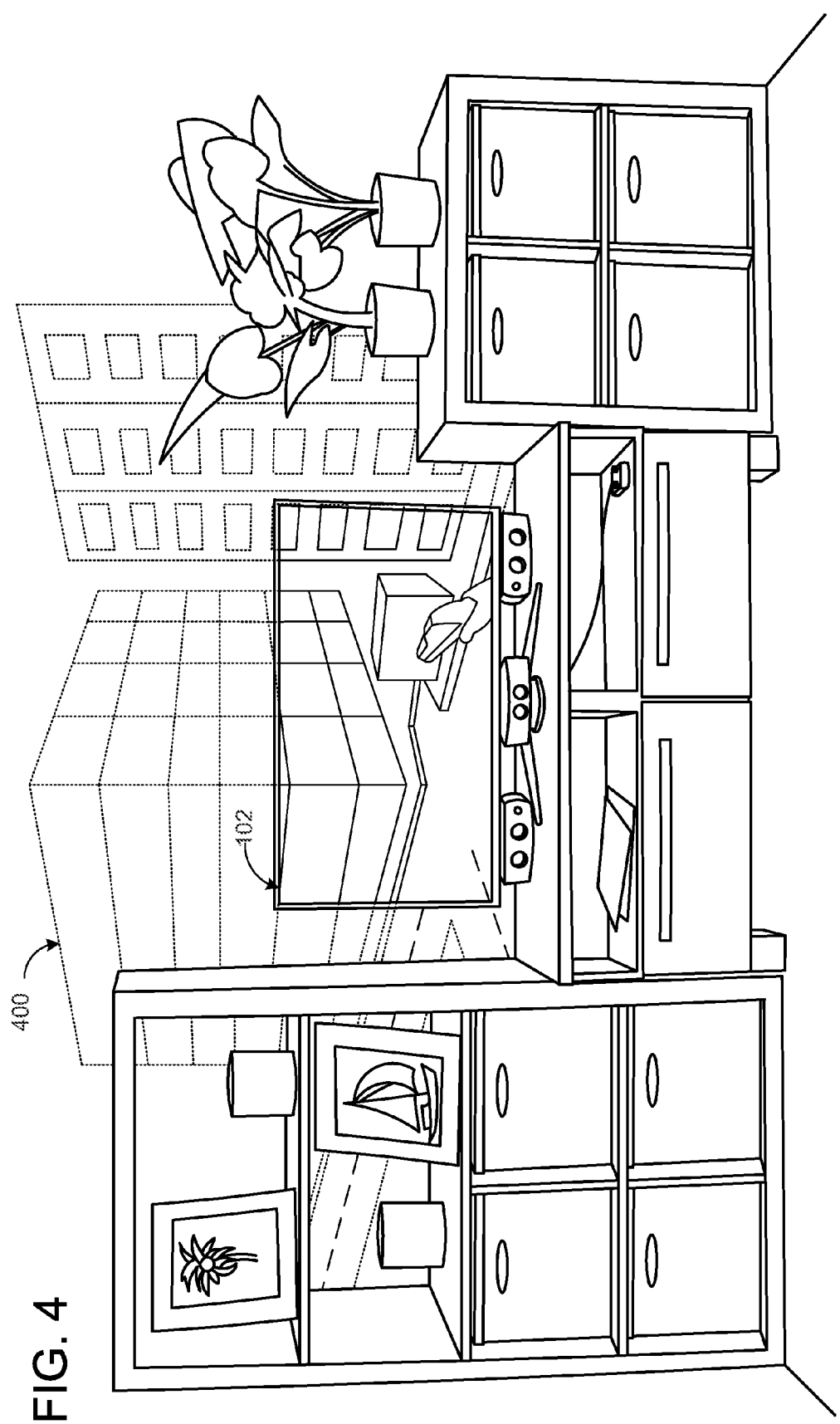

FIG. 4 shows a peripheral illusion 400 in which the game extends only onto the rear wall surrounding the primary display 102. In this non-limiting example, peripheral illusion 400 may be masked from one or more surfaces in the display environment. The one or more masked objects may include the primary display 102, all surfaces except those surfaces within a threshold distance of a projection plane (e.g., a wall behind the primary display), all surfaces nearer and/or farther than a tunable distance threshold, a user within the display environment, and/or selected objects within the display environment.

The wall, such as wall 108 of FIG. 1, or any other surface within a threshold distance of a segmented projection plane, can be found using any suitable method, such as a recursive RANSAC plane fitting procedure seeded with the location of the primary display. For example, in the illustrated embodiment, light is not projected onto the plants, bookshelf, decorations, or floor. It is also worth noting that the primary display may be masked from projection in all illusions.

Figure 5:
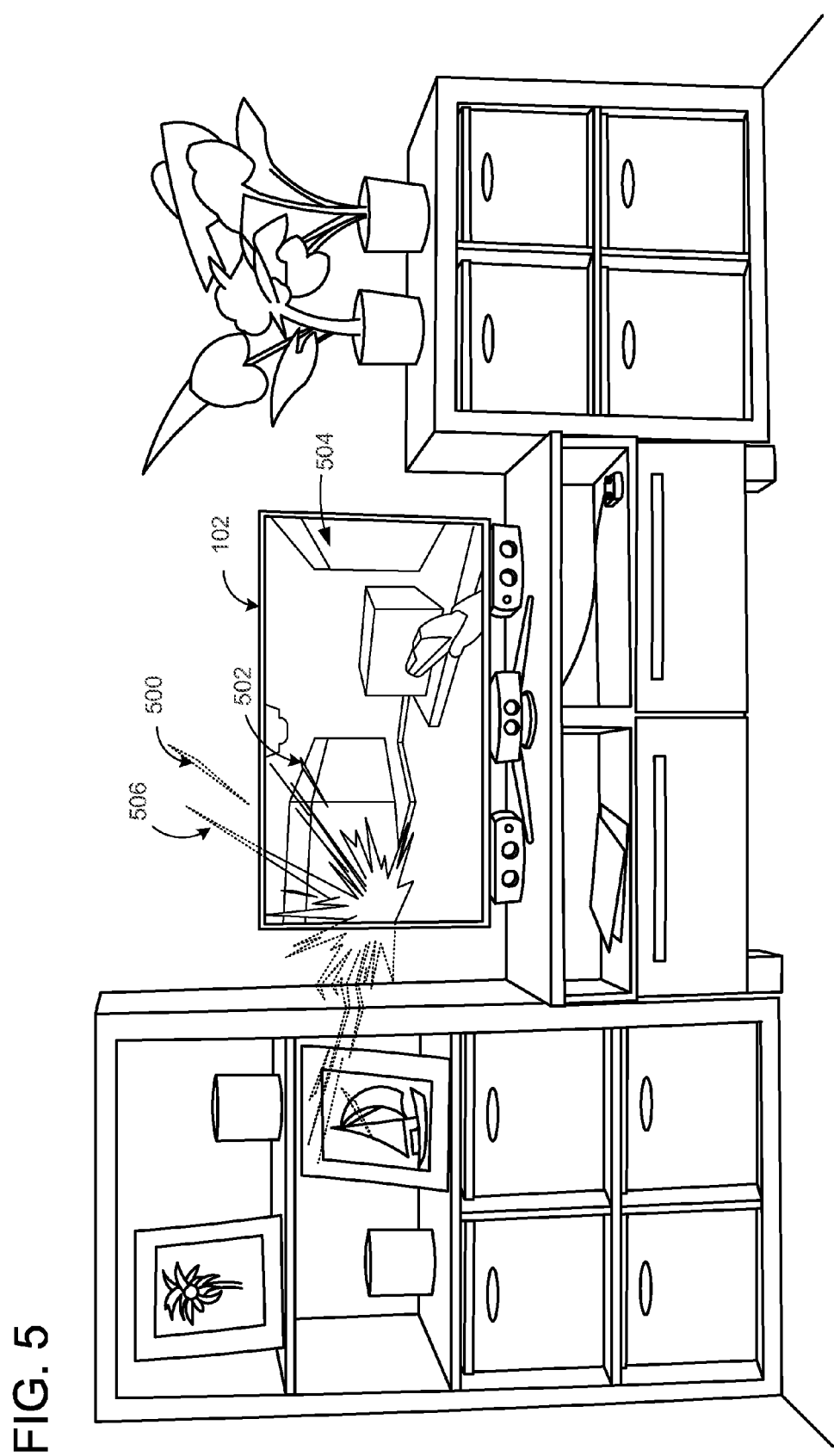

FIG. 5 shows a peripheral illusion 500 in which only certain game elements escape the primary image 502. For instance, in the illustrated first-person shooter, only explosion 506 is bled out of the primary image 502. Therefore, peripheral illusions may include an extension of selected elements of the primary image while not extending other elements (e.g., building 504).

The above described illusions increase immersion, induce apparent motion, and provide additional information about the game content. The illusions can be utilized individually or together. The illusions described above may be implemented with rendering level access to the video game content.

With or without rendering level access, apparent motion may be induced through peripheral visual flow. If rendering level access is not available, images displayed by the primary display may be analyzed to assess relative motion in the game or other viewing experience, and such motion may be enhanced with peripheral illusions.

Figure 6:
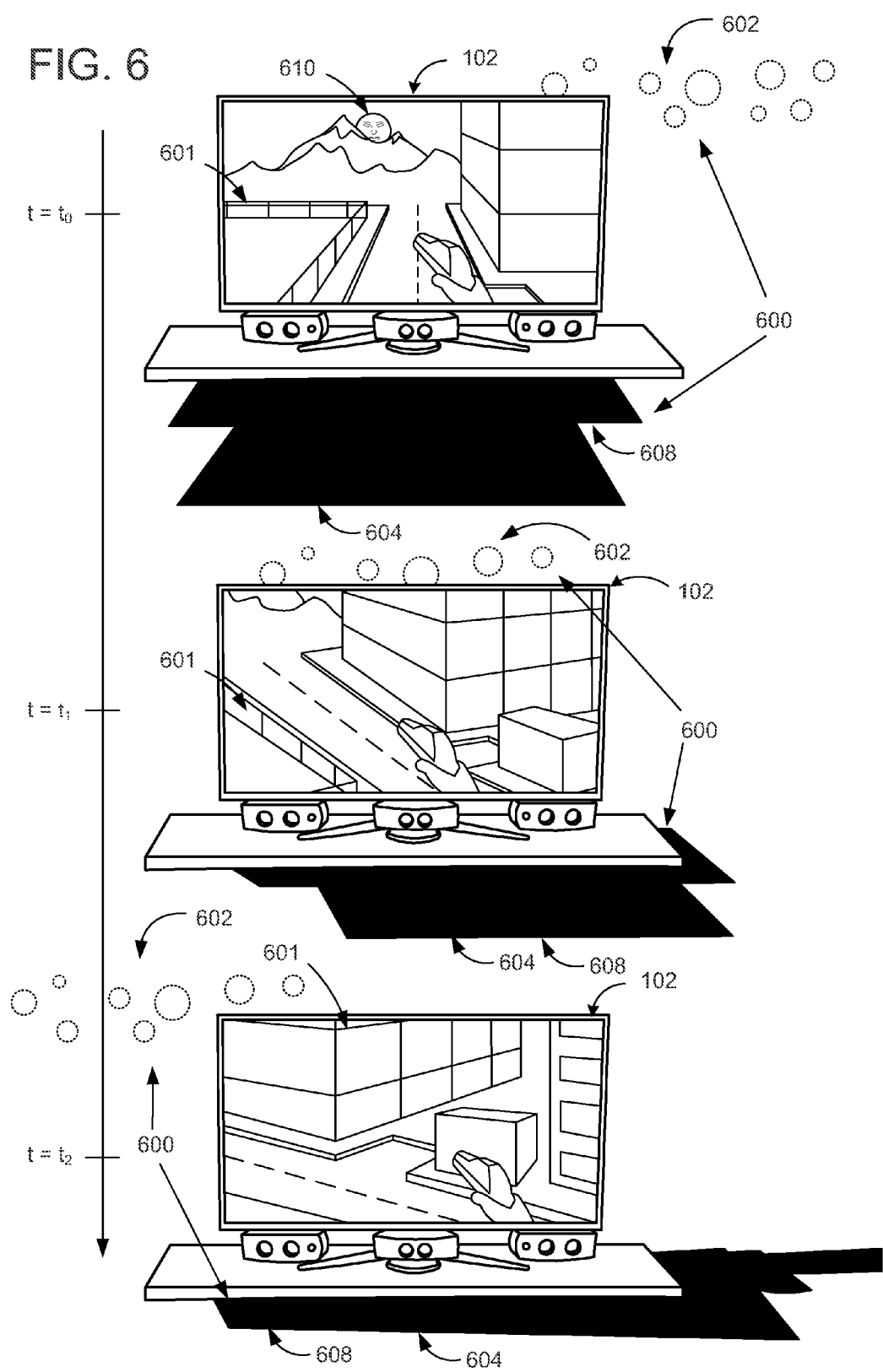

FIG. 6 shows a peripheral illusion 600 that enhances perception of apparent motion. In this non-limiting example, the peripheral illusion 600 includes a plurality of motion trackers (e.g., dots 602) synced with a changing perspective of the primary image 601 on the primary display 102. As shown from time $t_o$ to $t_2$, dots 602 move with the motion of the game. By sizing the dots differently, larger dots appear closer to the user and smaller dots appear more distant. The position and size of the individual dots may be moved/changed to create the illusion of apparent 3D motion.

A peripheral illusion in which an infinite grid moves with the motion in the game may also be used to create the illusion of apparent motion. When the user moves left or right, the grid moves in the opposite direction (the direction that objects in the game world move). When the user moves forwards and backwards, the grid zooms in and out, respectively. The animation of the grid, dots, or other visual trackers may give an impression of movement through space.

FIG. 6 also shows a peripheral illusion 604 used to change the appearance of the physical space around the primary display 102. In this non-limiting example, the peripheral illusion 604 includes apparent lighting (e.g., shadow 608) that extends virtual lighting (e.g., light from sun 610) of the primary image 601 as displayed by the primary display 102. Therefore, virtual lighting (e.g., light from sun 610) visible at a character's perspective in a video game may be used to change the appearance of the physical space around the primary display. Such shadow effects may be achieved by oversaturating non-shadow areas in the display environment with projected light, while masking the shadowed area.

The lighting in the room also can be changed based upon the mood or theme in the game. For example, for a space scene, the room could be illuminated by point light sources with harsh shadows. The lighting conditions within the virtual environment may be replicated in the physical space. For example, soft shadows and lighting from a single point light source may be implemented, where the system uses the closest point-light source in the game.

Peripheral illusions may also include a visual representation of the display environment on which the peripheral illusion is projected. The visual representation can be used to augment the display environment to match the theme or mood of a particular game or viewing experience. For example, if a cartoon game is being played, the display environment can be augmented to appear cartoonish.

Peripheral illusions may also include enhancements to the display environment. For example, illumination light may be projected into the room according to the location of specific room elements—light may be projected around light switches, around objects hung on the wall, in corners, etc.

The visual representation may also include a color distortion configured to cause a color of the display environment to appear to change. While it is difficult to completely replace existing surface colors, it is possible to augment the saturation or value of existing surface colors. For example, room colors can be super saturated to look like a cartoon by simply projecting the color of the surface back onto itself. As examples, red surfaces receive red light, blue surfaces receive blue light, etc. Similarly, colors may be desaturated, the scene may be outlined in silhouette edges, and/or other transformation may be made to the physical space. More complicated texture replacement is also possible, for example with procedural texturing.

Figure 7:
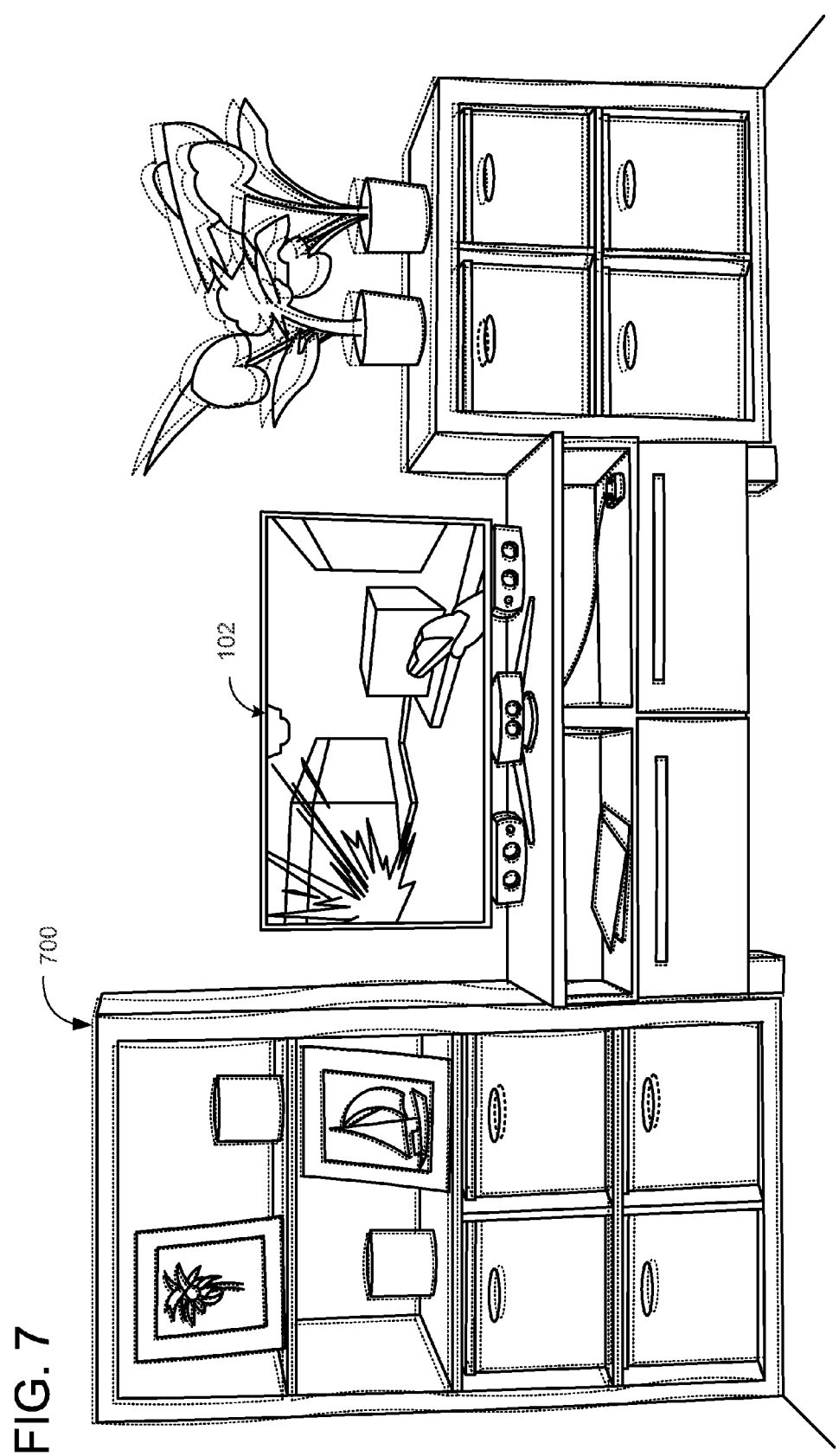

FIG. 7 shows a peripheral illusion 700 causing the display environment to appear to move (e.g., wobble). Such a peripheral illusion may be useful when paired with an explosion in a video game or film, for example. The position and/or size of objects in the room may be temporarily modified and/or distorted by projecting a distorted image of the scene back onto the scene. For example, an oversaturated projection of the room may be aligned with the room and the projected image may be distorted so that edges of the image move with a radial wobble, for example (e.g., the illusion displaces the original surface texture in an expanding, radial sinusoidal wave). Due to a projector's limited ability to compensate for surface color, these effects may be most effective if the displacements are small and short lived. As with the other peripheral illusions, because the user is typically focused on the primary display, the peripheral projections can be quite believable, and the room can actually seem to shake and/or bend as a result of the peripheral illusion.

Physical objects in the room can also be moved according to a predetermined script to enhance the viewing experience and/or display of peripheral illusions. For example, when a viewer bumps into a wall in the virtual reality, there may be a quick scale of the projected scene followed by a return to the normal scale. A slight lean (i.e., slight off-axis rotation) of the peripheral illusion may also be used in a driving game when a user drives around a banked corner.

A peripheral illusion in which an element of the primary image as displayed by the primary display moves from the primary image to the peripheral illusion may also be used. As an example, a grenade may roll out of the primary display, then bounce and roll around the physical environment according to a physics simulation using the room geometry. In this way, elements can appear to leave the primary display and bounce off of physical surfaces in the room. The element of the peripheral image as projected by the environmental display may also move from the peripheral illusion to the primary display. For example, a user could "pick-up" the grenade and throw it back "into" the primary display.

A peripheral illusion in which elements in the game enter and leave the primary display may also include snow falling in the primary display. In an example, falling snow may interact with the physical environment, briefly collecting on surfaces in the room. Similar to FIG. 6, the snow may move according to the movement of the user in the virtual environment, allowing the user to walk, ski, drive, or otherwise move through falling snow. Further, the color of the surfaces that would collect snow may be gradually whitened.

As described by way of the preceding examples, the peripheral illusions may include effects that depend on the depth/visible image of the room. The peripheral illusions can be physically responsive to the room geometry. The geometry and/or the appearance of the room is not only used for un-distortion of the projected visuals, but also may be used for physics behavior computations and/or content masking.

The audio of a game and/or movie may also be affected by events occurring in the primary image and/or peripheral illusion. For example, a virtual object may hit a physical object through the peripheral illusion and a corresponding explosion may sound. In another non-limiting example, a gunshot may echo in the room, and the viewer may hear the sound bounce from one side of the room to another.

The peripheral illusions may be extensions of the images displayed by the primary display, or the peripheral illusions may be completely different from the images displayed by the primary display. For example, when watching a black and white movie, the projector might turn a living room into a black and white experience. As another example, when playing a racing game, the projector may be used to implement weather effects (e.g., snow, rain, fog) that react to driving and the room configuration.

Peripheral illusions may optionally be executed by retrieving the rendering information for the peripheral illusions directly from the content defining the primary image. In such embodiments, the content creators (e.g., game designers) account for creating such peripheral illusions. However, peripheral illusions may be driven by extracting camera motion cues from the primary display images and/or by capturing the controller input. This allows for "automatic" driving of such illusions without having access to the game code.

Effects may be driven by the game or other viewing experience or potentially delivered in a separate track in parallel to the screen content. For example, an effects track that accompanies a movie in the same way as a subtitle track could trigger peripheral illusions. Such effects tracks may be delivered to a user by the same or a separate vendor than the original broadcaster/creator.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
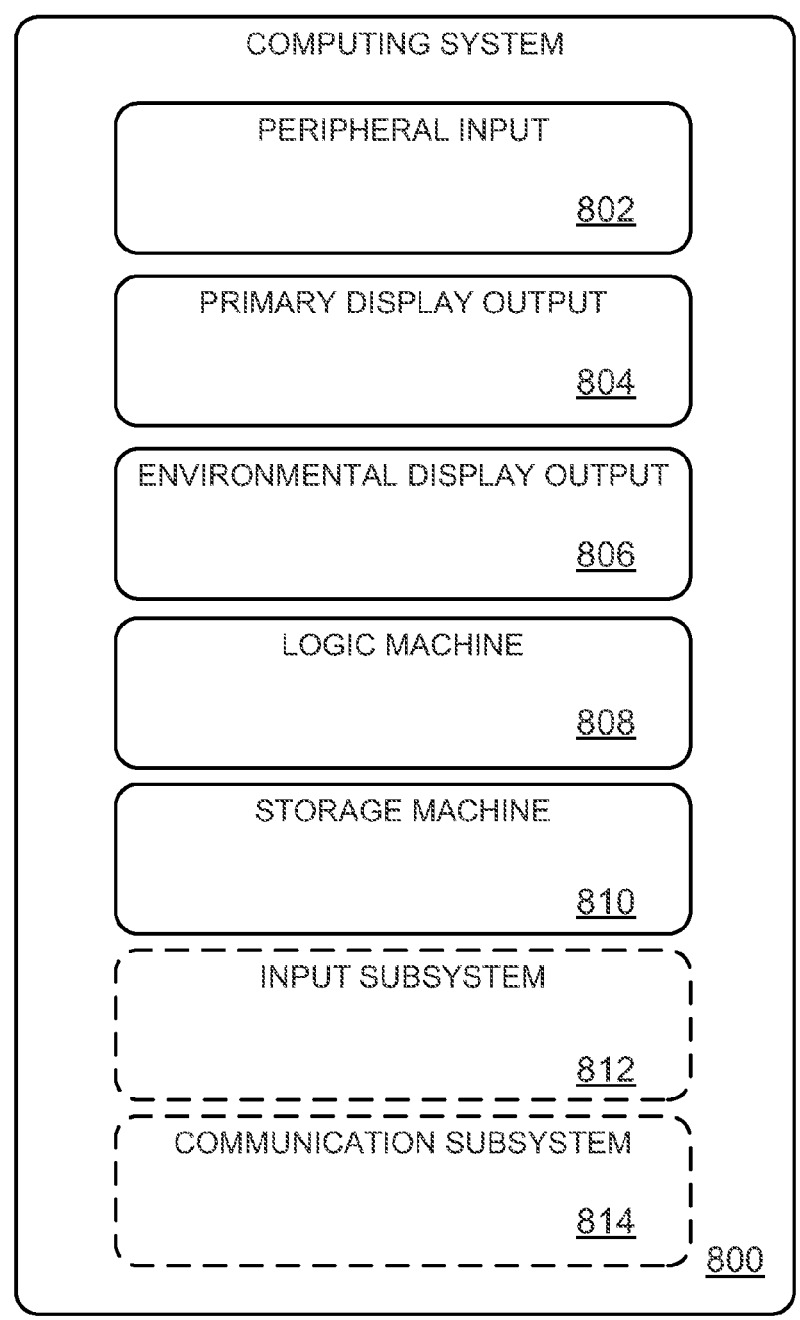
FIG. 8 schematically shows an example computing system in accordance with the present disclosure.

FIG. 8 schematically shows a non-limiting embodiment of an interactive computing system 800 configured to provide an immersive display experience within a display environment. The computing system 800 can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), augmented reality device, and/or other computing devices. In some embodiments, the computing system may be integrated with a stand-alone environmental display (e.g., projector) including a depth camera and/or other sensors. In such embodiments, the stand-alone environmental display may communicate with another device that controls the primary display. In some embodiments, the same device may control both the primary and environmental displays.

Computing system 800 includes a peripheral input 802, a primary display output 804, an environmental display output 806, a logic machine 808, and a storage machine 810. Computing system 800 may optionally include input subsystem 812, communication subsystem 814, and/or other components not shown in FIG. 8.

Peripheral input 802 may be configured to receive a depth input from a depth camera and/or other sensor information from other sensors. As a non-limiting example, peripheral input 802 may include a universal serial bus or any suitable wired or wireless interface.

Primary display output 804 may be configured to output a primary image (such as primary image 104 of FIG. 1) to a primary display (such as primary display 102 of FIG. 2). As a non-limiting example, primary display output may include an HDMI or any suitable wired or wireless interface.

Environmental display output 806 may be configured to output a peripheral image to an environmental display (such as environmental display 200 of FIG. 2). As a non-limiting example, environmental display output may include an HDMI or any suitable wired or wireless interface.

Logic machine 808 includes one or more physical devices configured to execute instructions. Logic machine 808 may be operatively connectable to the primary display via the primary display output 804, to the environmental display 200 via the environmental display output 806, and to the depth camera or other sensors via the peripheral input 802. The logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 810 includes one or more physical devices configured to hold instructions executable by the logic machine to implement the methods and processes described herein. Storage machine 810 may also hold instructions that allow the logic machine to determine a location of the primary display from the depth input, output the primary image to the primary display, and output the peripheral image to the environmental display for projection as a peripheral illusion such that the peripheral illusion appears as an extension of the primary image. When such methods and processes are implemented, the state of storage machine 810 may be transformed (e.g., to hold different data).

Storage machine 810 may include removable and/or built-in devices. Storage machine 810 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 810 may include volatile, nonvolatile, dynamic, static, read/write, read-only, random-access, sequential-access, location-addressable, file-addressable, and/or content-addressable devices.

It will be appreciated that storage machine 810 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 808 and storage machine 810 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, input subsystem 812 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 814 may be configured to communicatively couple computing system 800 with one or more other computing devices. Communication subsystem 814 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An interactive computing system configured to provide an immersive display experience within a display environment, the system comprising:
 an environmental display output configured to output a peripheral image to an environmental display;
 a logic machine operatively connectable to the environmental display via the environmental display output; and
 a storage machine holding instructions executable by the logic machine to output the peripheral image to the environmental display for projection as a peripheral illusion around a primary display, the peripheral illusion including a visual representation of the display environment on which the peripheral illusion is projected.

2. The interactive computing system of claim 1, wherein the peripheral illusion is masked from one or more surfaces in the display environment.

3. The interactive computing system of claim 2, wherein the one or more masked surfaces includes the primary display.

4. The interactive computing system of claim 2, wherein the one or more masked surfaces includes all surfaces except those surfaces within a threshold distance of a projection plane.

5. The interactive computing system of claim 1, wherein the visual representation includes a geometric distortion configured to cause the display environment to appear to move.

6. The interactive computing system of claim 1, wherein the visual representation includes a color distortion configured to cause a color of the display environment to appear to change.

7. The interactive computing system of claim 1, wherein the peripheral illusion includes a plurality of motion trackers synced with a changing perspective of the primary image on the primary display to enhance perception of apparent motion.

8. The interactive computing system of claim 1, wherein the peripheral illusion includes apparent lighting that extends virtual lighting of the primary image as displayed by the primary display.

9. The interactive computing system of claim 1, wherein an element of the primary image as displayed by the primary display moves from the primary image to the peripheral illusion.

10. The interactive computing system of claim 1, wherein an element of the peripheral image as projected by the environmental display moves from the peripheral illusion to the primary display.

11. The interactive computing system of claim 1, wherein the peripheral illusion includes a full color extension of the primary image.

12. The interactive computing system of claim 1, wherein the peripheral illusion includes an extension of high contrast edges of the primary image.

13. The interactive computing system of claim 1, wherein the peripheral illusion includes an extension of selected elements of the primary image.

14. The interactive computing system of claim 1, further comprising a peripheral input configured to receive a depth input from a depth camera, the depth input identifying a location of the primary display and features of display environment on which the peripheral illusion is projected, the instructions further executable by the logic machine to generate and output the peripheral illusion based at least on the depth input from the depth camera and the location of the primary display.

15. One or more storage machines holding instructions executable by one or more logic machines, the instructions configured to provide an immersive display experience within a display environment, the instructions configured to:
 recognize a position of a primary display in the display environment; and
 output a peripheral image to an environmental display for display as a peripheral illusion around the primary display, the peripheral illusion including a visual representation of the display environment on which the peripheral illusion is projected.

16. The storage machine of claim 15, wherein the peripheral illusion is masked from one or more surfaces in the display environment.

17. The storage machine of claim 15, wherein the one or more masked surfaces includes the primary display.

18. The storage machine of claim 15, wherein the environmental display is a see-through display and the peripheral illusion is an augmented reality image displayed by the see-through display.

19. An interactive computing system configured to provide an immersive display experience within a display environment, the system comprising:
 a peripheral input configured to receive a depth input from a depth camera;
 a primary display output configured to output a primary image to a primary display;

an environmental display output configured to output a peripheral image to an environmental display;

a logic machine operatively connectable to the primary display via the primary display output, to the environmental display via the environmental display output, and to the depth camera via the peripheral input; and a storage machine holding instructions executable by the logic machine to:

determine a location of the primary display from the depth input;

output the primary image to the primary display; and output the peripheral image to the environmental display for projection as a peripheral illusion masked from the determined location of the primary display, the peripheral illusion including a visual representation of at least a portion of the display environment on which the peripheral illusion is projected.

\* \* \* \* \*